United States Patent [19]

Warren

[11] Patent Number: 5,476,819
[45] Date of Patent: Dec. 19, 1995

[54] SUBSTRATE ANCHOR FOR UNDERCUT SILICON ON INSULATOR MICROSTRUCTURES

[75] Inventor: Keith O. Warren, Newbury Park, Calif.

[73] Assignee: Litton Systems, Inc., Woodland Hills, Calif.

[21] Appl. No.: 251,902

[22] Filed: Jun. 1, 1994

Related U.S. Application Data

[63] Continuation-in-part of Ser. No. 97,084, Jul. 26, 1993.
[51] Int. Cl.[6] .................. H01L 21/465; G01P 15/08; G01P 15/13
[52] U.S. Cl. .................. 437/228; 437/927; 156/629.1; 156/630.1; 156/632.1
[58] Field of Search .................. 437/228, 901, 437/921, 927; 156/629.1, 630.1, 632.1, 633.1, 657.1; 73/514.18, 514.21, 514.23, 514.32, 514.36, 514.37; 361/283.2, 283.1, 283.3; 216/33

[56] References Cited

U.S. PATENT DOCUMENTS

| | | | |
|---|---|---|---|
| 5,006,487 | 4/1991 | Stokes | 437/228 |
| 5,205,171 | 4/1993 | O'Brien et al. | 73/517 |
| 5,220,838 | 6/1993 | Fung et al. | 73/721 |
| 5,332,469 | 7/1994 | Mastrangelo | 156/643 |
| 5,352,918 | 10/1994 | Thomas et al. | 257/417 |
| 5,381,300 | 1/1995 | Thomas et al. | 361/280 |
| 5,406,454 | 4/1995 | Dinger et al. | 361/752 |
| 5,431,051 | 7/1995 | Biebl et al. | 73/517 |

OTHER PUBLICATIONS

U.S. patent application Ser. No. 08/097,084, filed Jul. 26, 1993, by Warren.

Primary Examiner—R. Bruce Breneman
Assistant Examiner—M. L. Whipple
Attorney, Agent, or Firm—Paul Y. Feng; Poms, Smith, Lande & Rose

[57] ABSTRACT

An accelerometer is fabricated by forming a proofmass and at least one associated hinge in a silicon substrate through a variety of a etching and bonding processes is disclosed. The processes entail ion implantation and formation of an oxide support layer below the proofmass, integrally bonding two complementary proofmass and substrate structures together, and then removing the oxide support layer to leave the proofmass supported by the hinge within the body of silicon material. The proofmass may be electrically connected to a lead extending through an etched recess in one of the substrates, and the proofmass may be electrically isolated or separated from the substrates by an oxide layer and by a change in conductivity type of the semiconductor material wherein the hinge is structurally mounted to the substrates. In a bond and etch back process, the wafer is processed, sawed in half, and then bonded together again wherein the complementary halves are joined to obtain the finished accelerometer. As part of the bond and etch-back process, an anchor for bridging the silicon substrate to an oxide support substrate includes using a selective epitaxy or non-selective epitaxy process to grow the polysilicon anchors.

21 Claims, 29 Drawing Sheets

FIG. 1
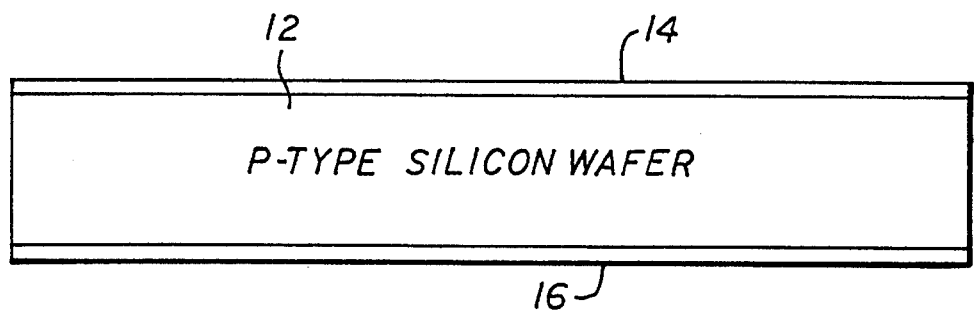
FIG. 2
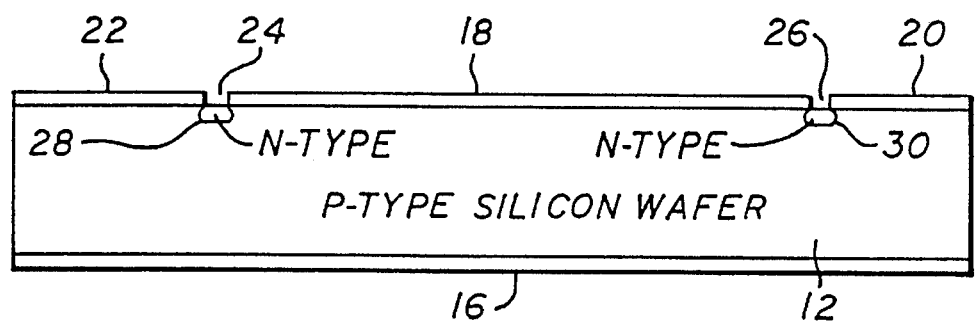
FIG. 3
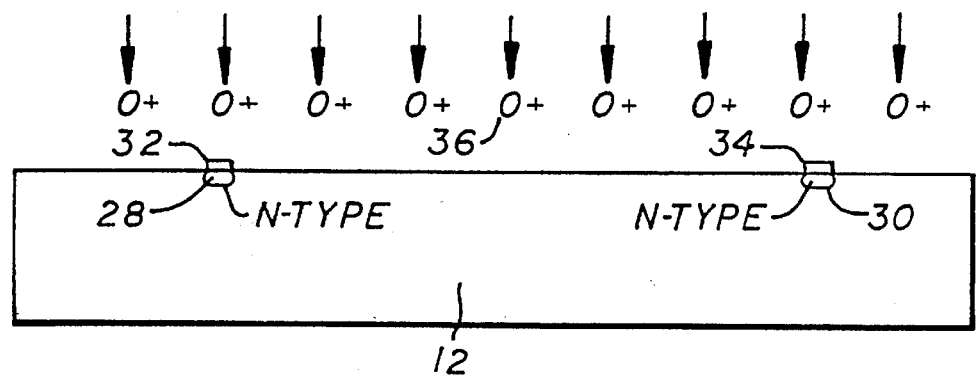
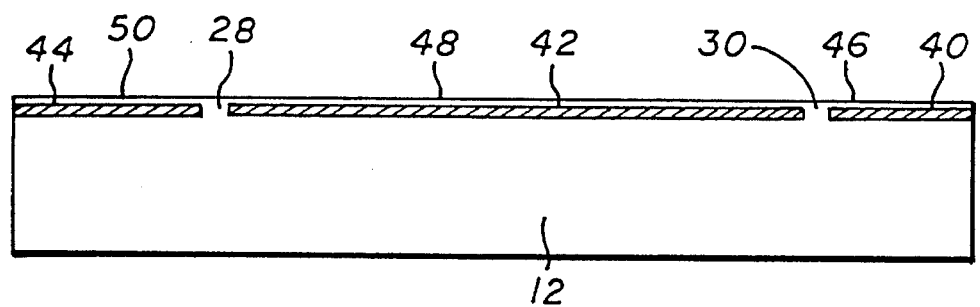
FIG. 4

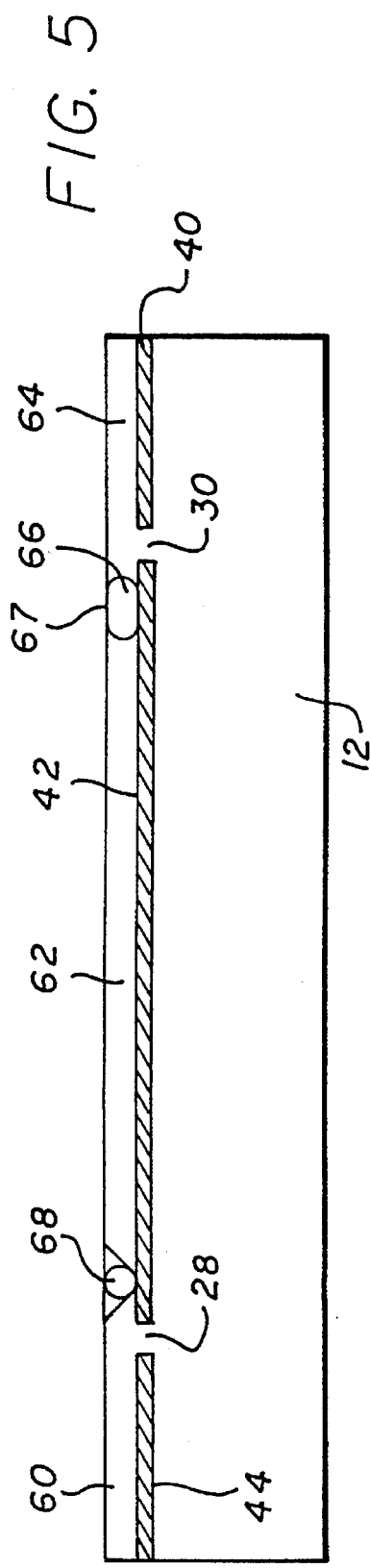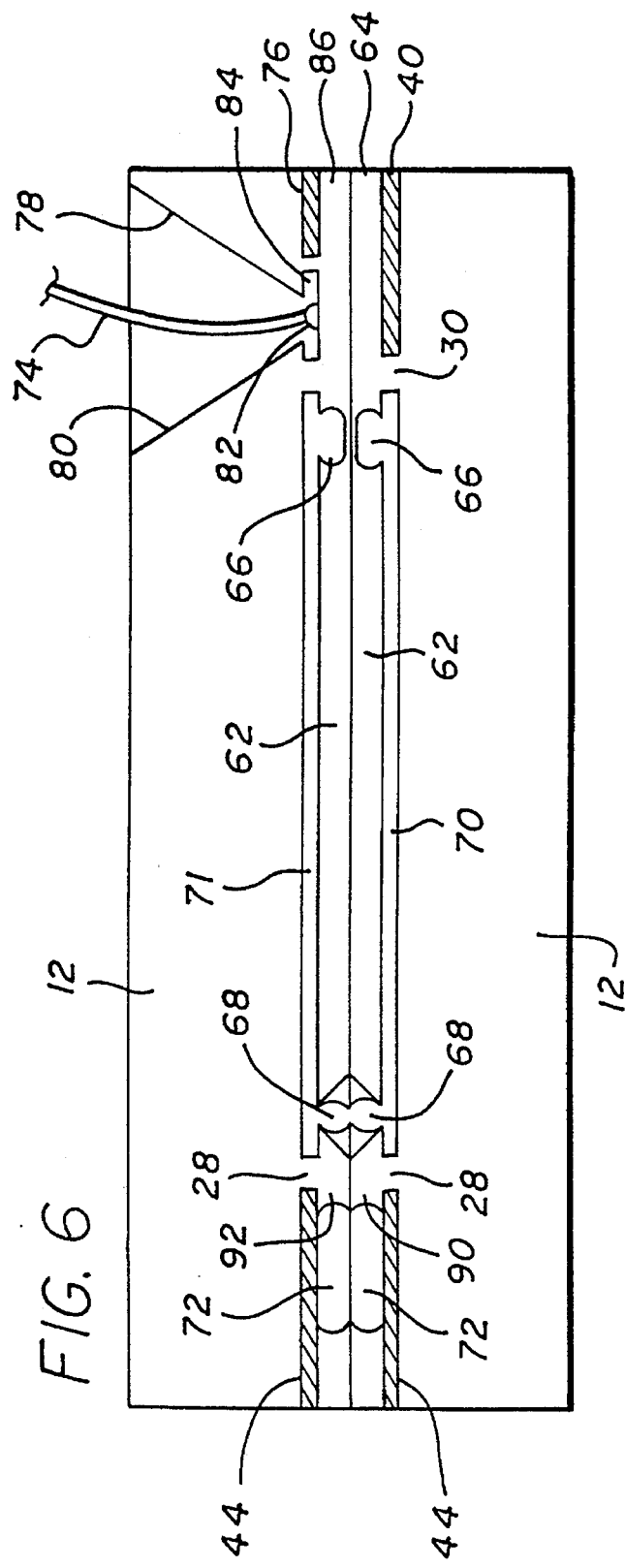

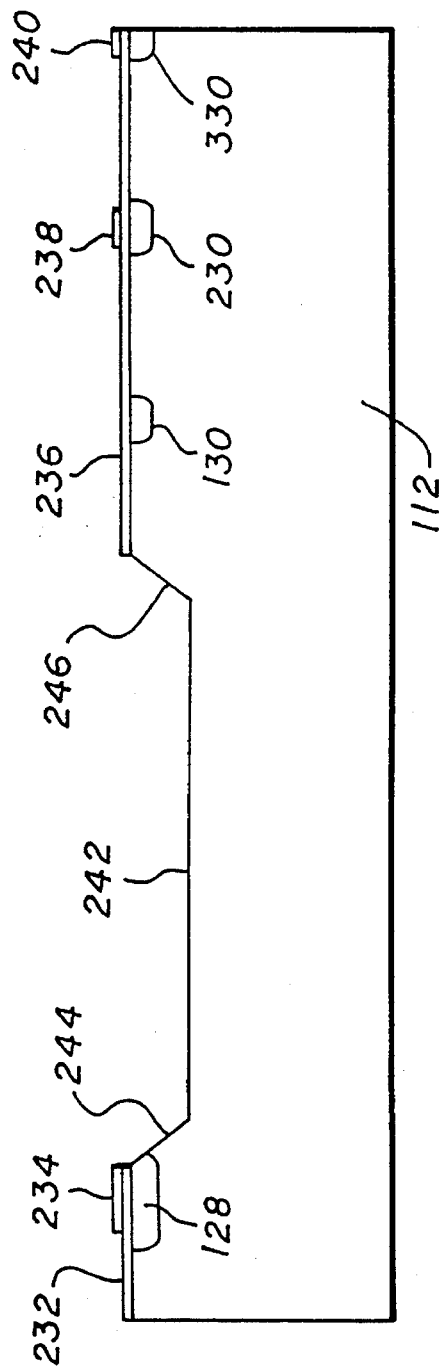
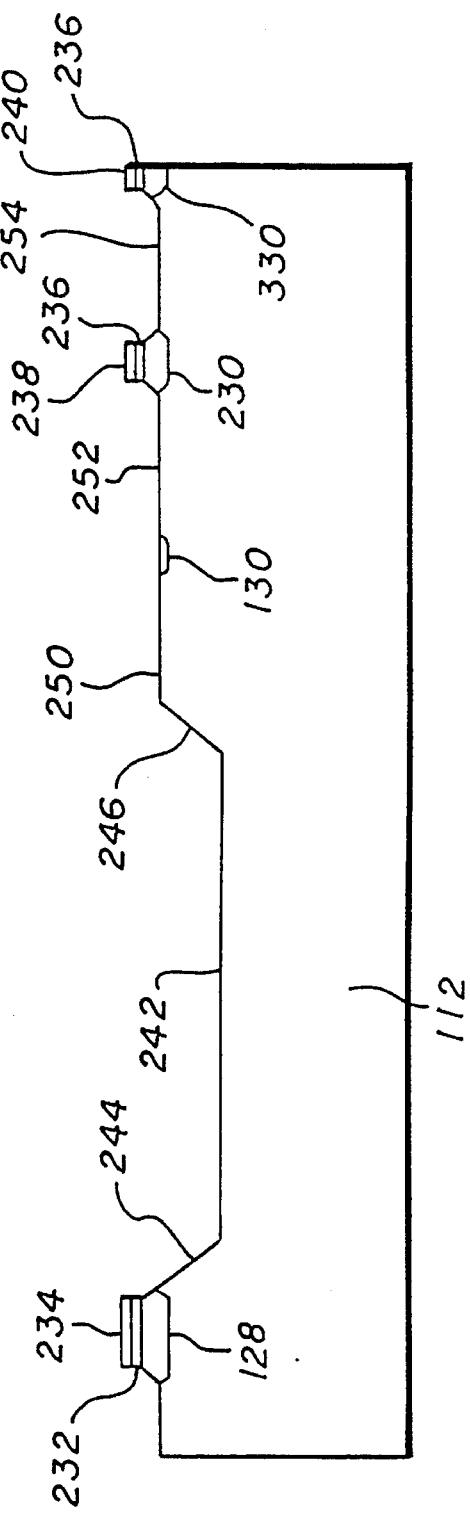

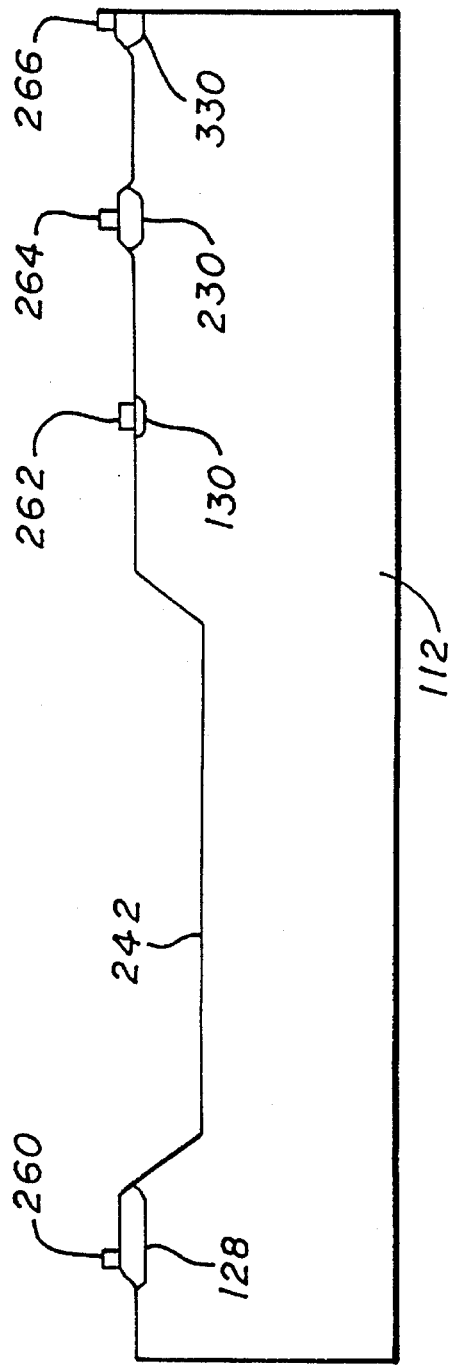
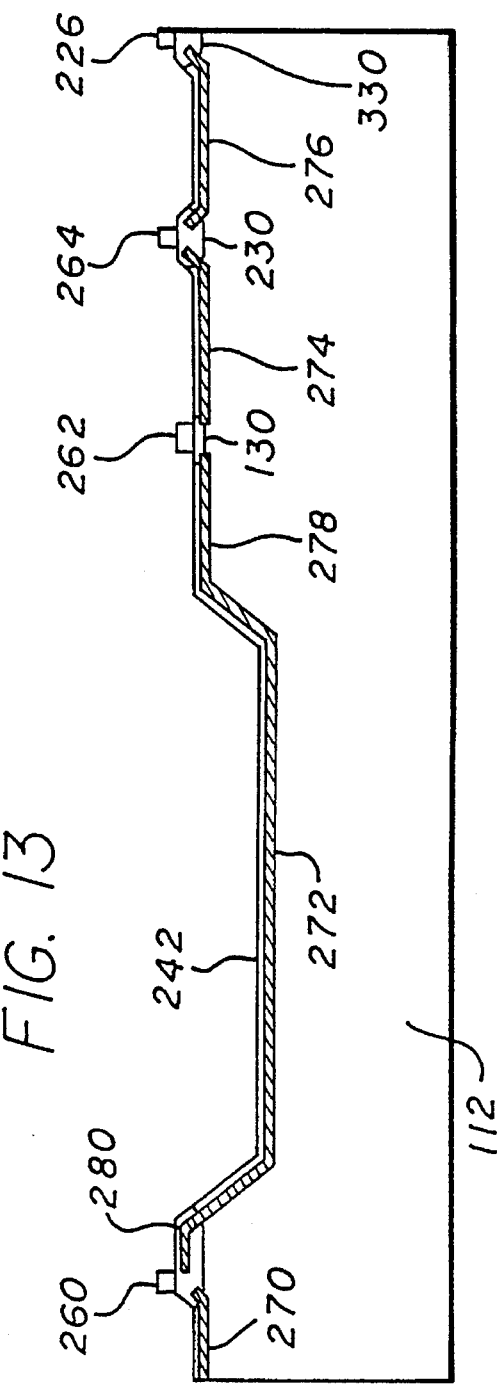

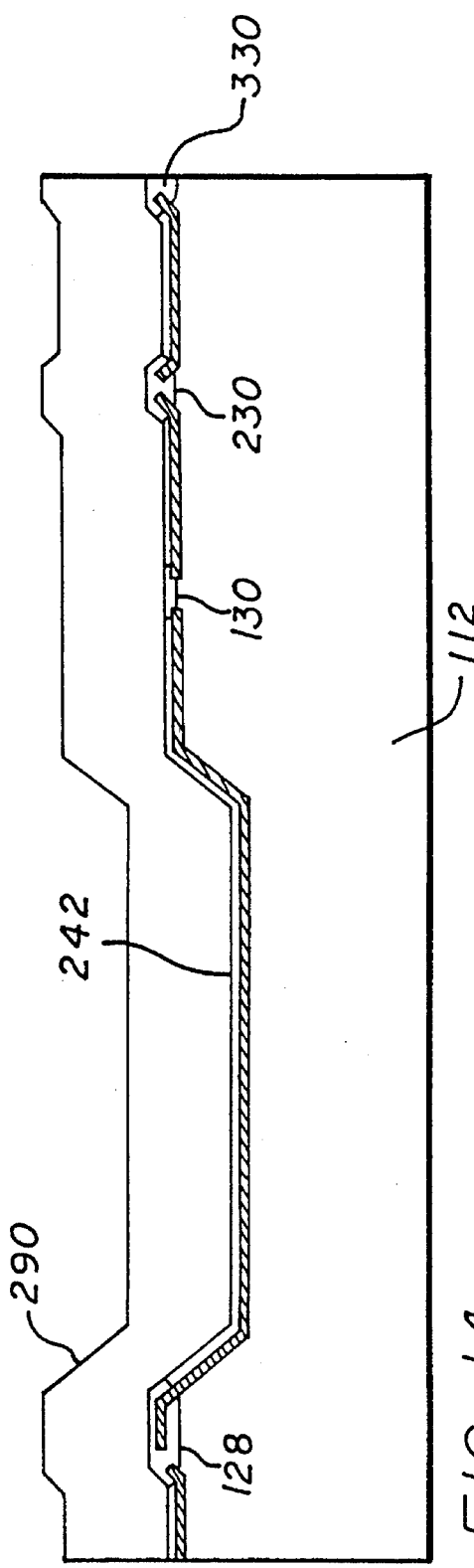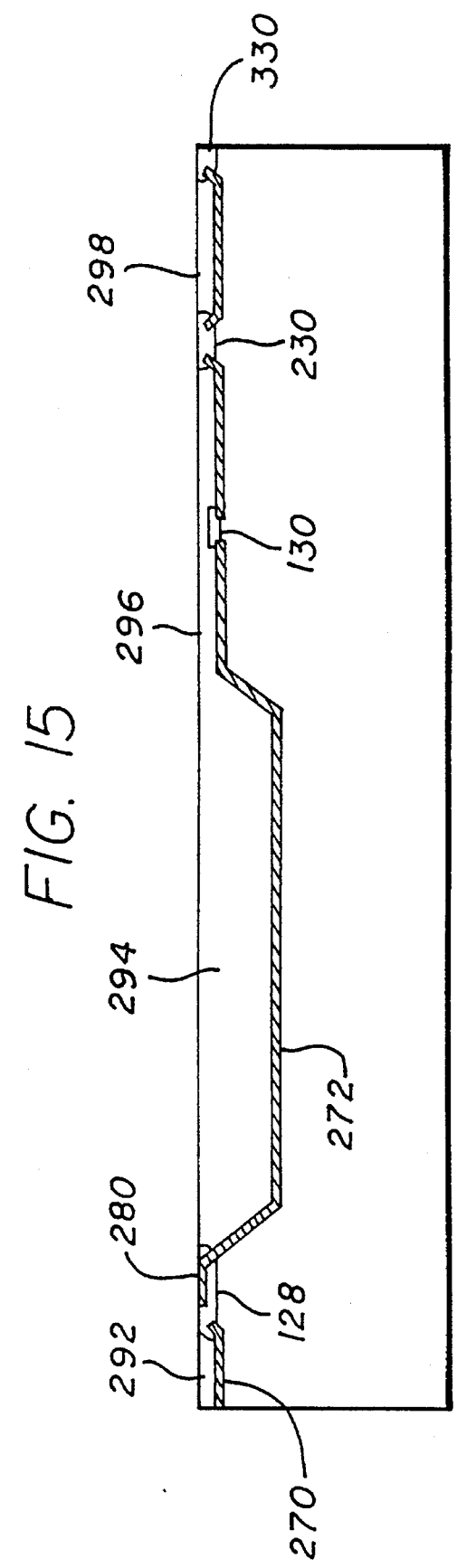

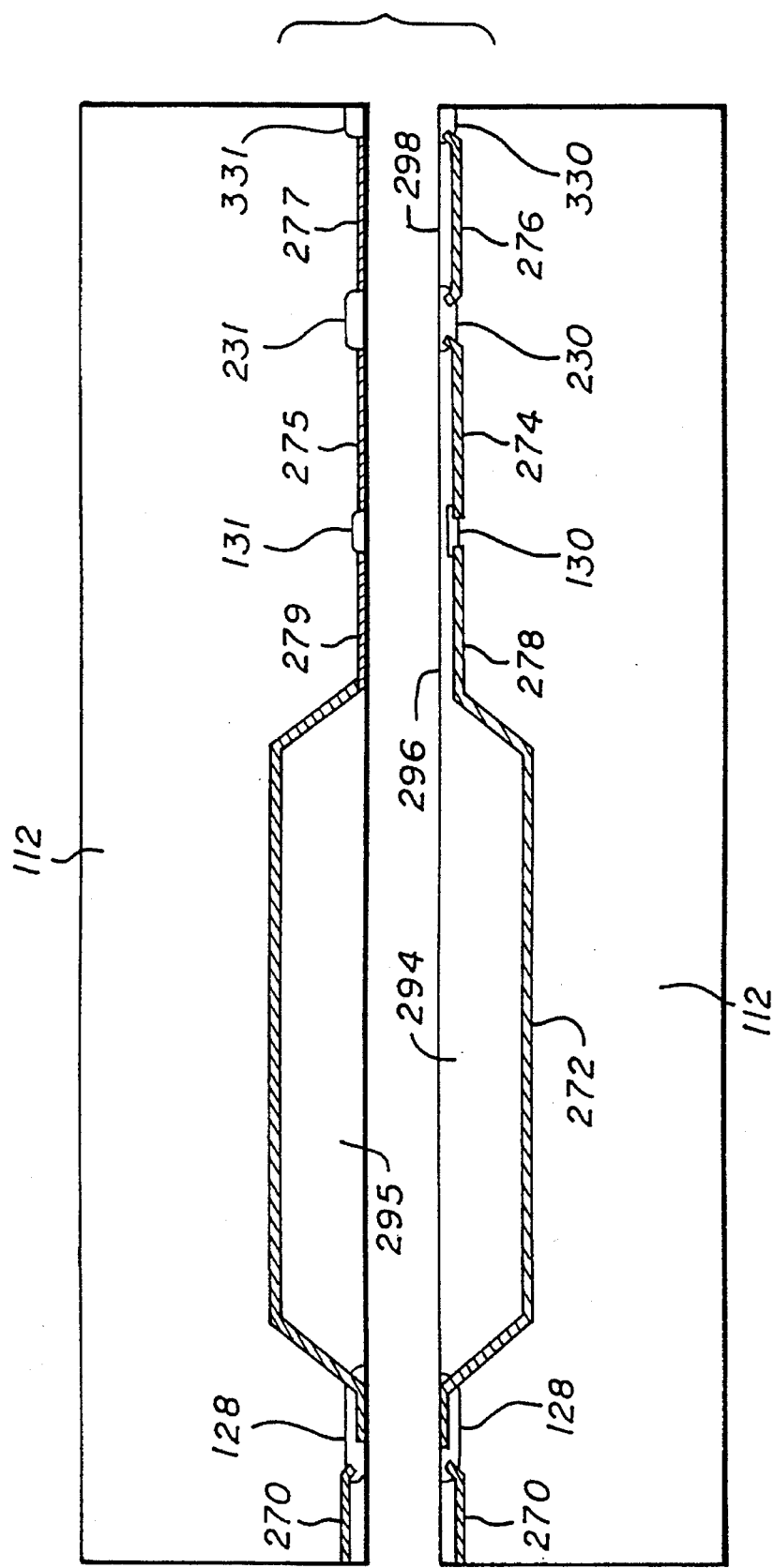

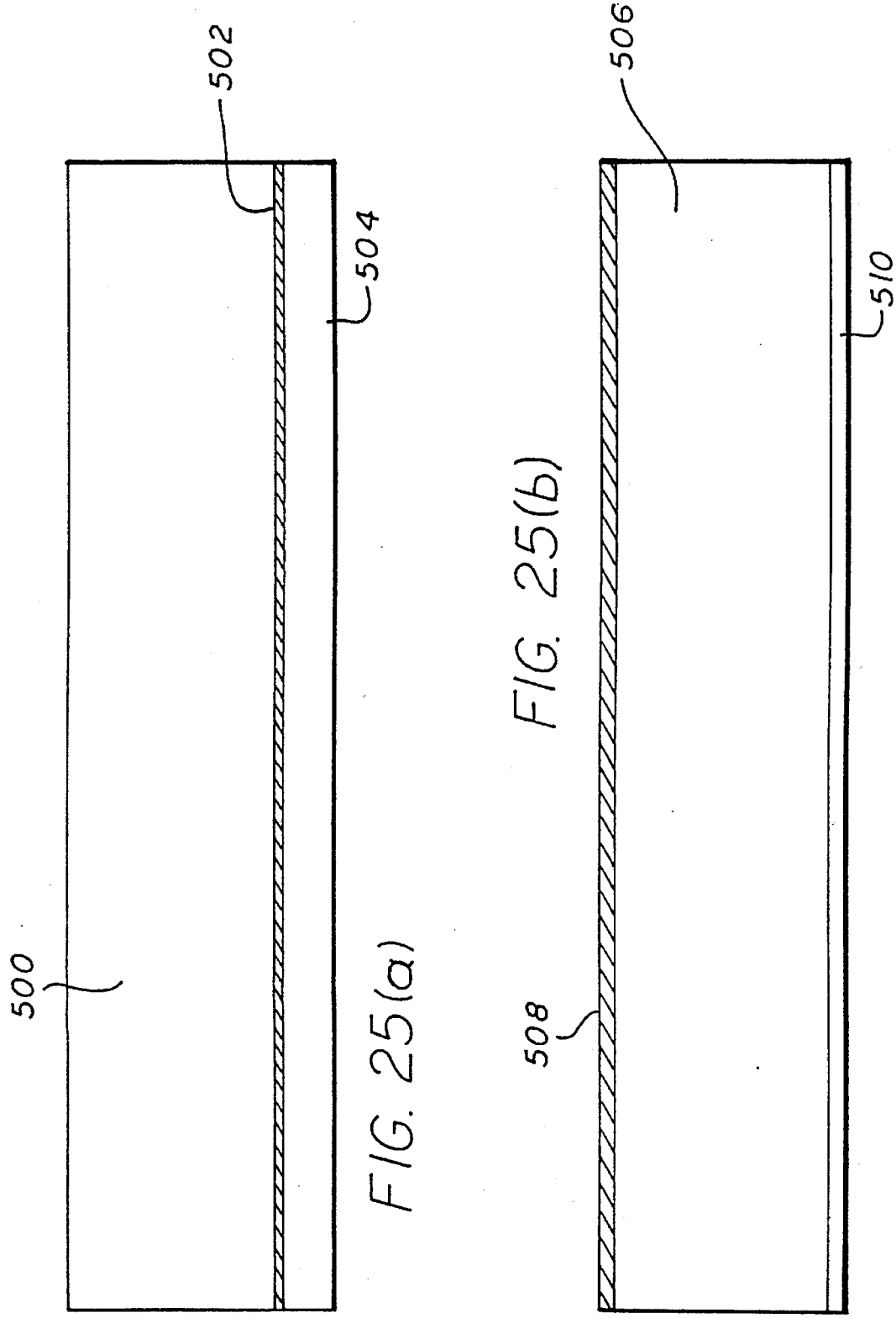

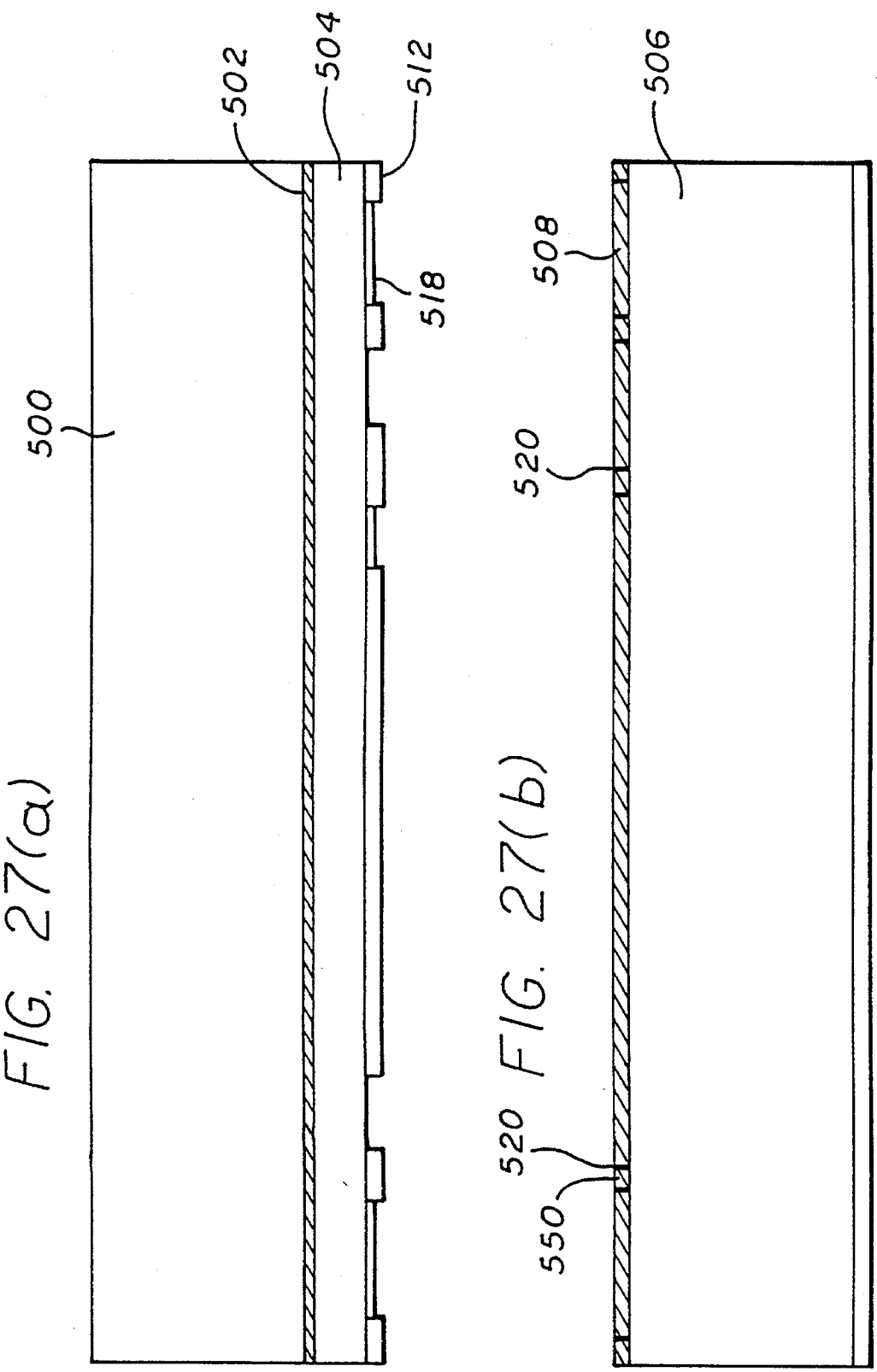

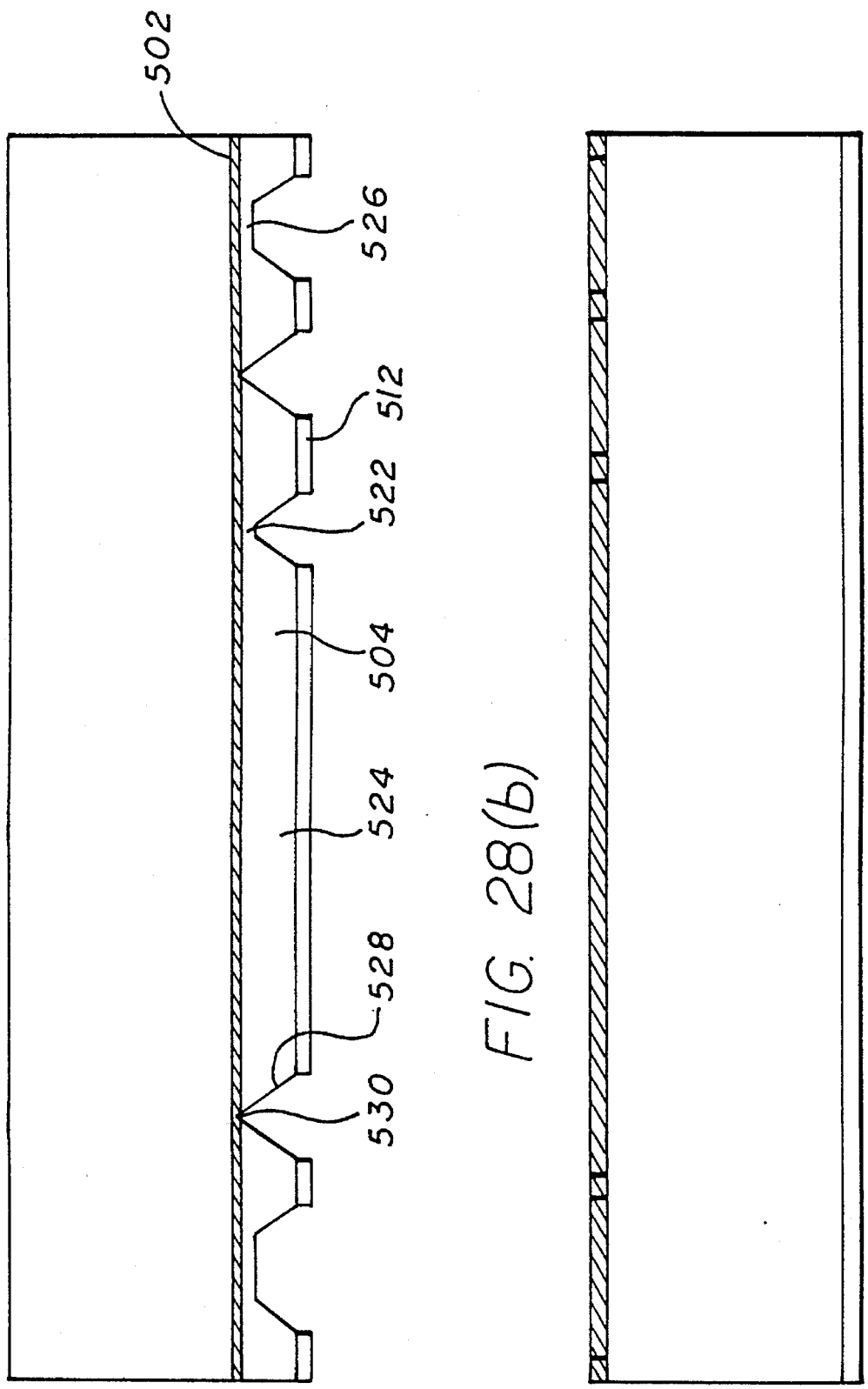

SUBSTRATE ANCHOR FOR UNDERCUT SILICON ON INSULATOR MICROSTRUCTURES

This is a continuation-in-part application of a co-pending parent application Ser. No. 08/097,084 filed Jul. 26, 1993 by the same inventor, entitled "Electrostatically Force Balanced Silicon Accelerometer."

FIELD OF THE INVENTION

The present invention relates generally to methods of fabricating microstructures in semiconductor substrates for use in precise measurement instruments such as, for example, accelerometers. In particular, the present invention relates to methods of attaching an epitaxial silicon layer to an oxidized substrate wafer wherein the former has been transferred to the latter through a bond and etch back process.

BACKGROUND OF THE INVENTION

Accelerometers have been employed in a variety of applications. For example, accelerometers have been employed to help determine the acceleration or deceleration of a ship or plane, to monitor the forces being applied to an apparatus or device, such as a car, train, bus, and the like.

A typical prior art accelerometer used a pendulum type transducer in which acceleration is detected by noting the displacement of the pendulum. A force is applied to the pendulum, generally by electromagnetic currents, in order to force the pendulum back to its initial, resting position. By measuring the current required to generate this electromagnetic field, the acceleration can be determined. From there, the product of the acceleration times the mass is the force.

More modern accelerometers rely on a movable electrode located between two fixed electrodes, as discussed in Suzuki and Tuchitani, "Semiconductor Capacitance-type Accelerometer with PWM Electrostatic Servo Technique," Sensors and Actuators, A1-A23 (1990) 316–319, and European Patent Application No. EPO 338688 A1. The Suzuki, et al. invention employs a silicon movable electrode located at the end of a cantilever attached to a silicon base. The movable electrode is spaced apart from two fixed electrodes located on either side of the movable electrode. This apparatus is sandwiched within a glass structure and electrically connected to monitoring circuitry. Circuitry is generally shown in the Suzuki article and patent application.

Additional circuit configurations are described in U.S. Pat. No. 5,142,921, issued to Stewart, et al., and U.S. Pat. No. 3,877,313, issued to Ferriss, et al.

U.S. Pat. No. 4,679,434, issued to Stewart, discloses a sandwich-type accelerometer in which a semiconductor substrate is sandwiched between two non-conductive plates. This configuration employs hinges having crossed blades to provide the desired flexure and strength. The accelerometer is kept in close proximity to the signal processing circuitry by mounting it in a hybrid package along with the signal processing circuitry.

Both the Stewart accelerometer and the Suzuki accelerometer require the intricate assembly of a three-piece structure. Proper alignment and orientation of the fixed electrodes with the movable electrode are necessary for proper operation of the device. This alignment and assembly are made more difficult by the physical size of the devices. The movable electrode is necessarily extremely thin and the flexures are also fragile.

Even more delicate is the cantilever of Suzuki or the hinge of Stewart, both of which can be readily fractured or snapped by rough handling. In the cantilever of Suzuki or the hinge of Stewart, it is also more difficult to keep both sides of the middle substrate clean during three-layer alignment, and more difficult to "chuck" or hold the middle wafer of a three-wafer stack.

An even greater danger is the formation of microcracks within the crystalline structure of the cantilever member. These microcracks may go undetected during assembly, but may fail in operation or begin to produce erroneous readings as the cracks propagate and/or reduce electrical conductivity.

The crossed blade design of Stewart provides lateral stability of the movable electrode, allowing the movable electrode to flex along the vertical axis. This reduces the sensitivity to anomalies which may result from torsional or twisting forces. The crossed blades of Stewart employ grooves having sharp ends which terminate into the silicon crystal structure. These sharp terminations provide stress points where microcracks may begin to develop.

The Suzuki design employs a single cantilever located near the middle of the movable electrode, also known as the proofmass. This central point of contact makes the Suzuki device susceptible to torsional instabilities arising from the electrostatic negative spring. This can result in erroneous readings as the movable electrode will appear to be closer to both fixed electrodes as a result of the twisting. For higher ranges, the negative spring rate can easily overcome the torsional spring rate of the hinges. This configuration also provides sites where microcracks can originate, leading to a degradation of the device.

U.S. Pat. No. 5,115,291, issued to Stokes, employs a four-step assembly process in order to locate a movable electrode on a cantilever in between two fixed electrodes. The Stokes invention dopes the movable electrode differently than the cantilever. The Stokes invention also employs cantilevers located on all four sides of the movable electrode in order to maintain the position and orientation of the movable electrode.

The Suzuki and other similar devices use Pyrex outer edges on which the fixed electrodes are mounted. Pyrex glass or other types of glass are not exceptional thermal conductors; they are two orders of magnitude less than silicon. Pyrex can support a temperature gradient through the thickness of the glass, however. The semiconductor material forming the fixed electrodes has thermal conductive characteristics far superior to the Pyrex on which it is mounted. The thermal expansion coefficient mismatch between silicon and Pyrex is approximately 10%. This difference is sufficient to cause stress of the silicon from the Pyrex and distortions of the structure as temperature varies.

A need therefore exists for fabricating a solid state measurement instrument such as an accelerometer which can be reliably manufactured with a minimum of handling. The design and structure of the accelerometer should be such that the exposed stress points are reduced, preventing or eliminating the formation of microcracks.

SUMMARY OF THE INVENTION

The present invention therefore contemplates the processes for forming a solid state instrument such as an accelerometer using a minimal number of mechanical assembly operations. It is further contemplated that the present invention processes form a solid state accelerometer which has no exposed stress points from which microcracks can emanate. It is also contemplated that the present invention provide a design which may be uniformly and reliably fabricated. It is additionally contemplated that the present invention provide an accelerometer design that minimizes thermal distortions.

In a preferred embodiment, the present invention provides methods of forming a solid state measurement instrument such as an accelerometer, in which a proofmass is located at the end of a hinge. The proofmass is surrounded on top and bottom by fixed electrodes, allowing movement of the proofmass to be detected by external circuitry. The present invention may be formed using a single silicon wafer, thereby reducing the effects of wafer-to-wafer variation in the fixed electrodes and in the proofmass itself. The present invention is preferably formed using a single alignment to locate the proofmass between the fixed electrodes. The present invention is also preferably formed before the proofmass and hinges are physically separated from the underlying silicon wafer in order to prevent the hinges and proofmass from being stressed or otherwise damaged during fabrication handling.

In another embodiment, the topography of the proofmass and hinges are such that the hinges are located near the edges of the proofmass along one side of the proofmass. The hinges, also known as flexures, are preferably slotted to provide apertures for a selective etch to undercut the hinges in the time required to define the proofmass perimeter. The result is a constant thickness of the hinges.

In yet another embodiment of the present invention, mass is added to the proofmass by forming complementary proofmass sections in different portions (i.e., left and right halves) of the wafer. These complementary portions are then joined to form a single proofmass having greater mass than may otherwise be available to form a proofmass. The hinge attaching the proofmass to the wafer is removed in one embodiment of the present invention in order to prevent a seam from forming through the length of the hinge, thus ensuring a uniform crystalline structure of the hinge. This also keeps the hinge very close to midplane of the proofmass.

BRIEF DESCRIPTION OF THE DRAWINGS

FIG. 1 is a side cross-sectional view of an embodiment of the present invention during wafer processing;

FIGS. 2 through 5 are additional side cross-sectional views of the embodiment of FIG. 1 during successive steps of wafer fabrication;

FIG. 6 is a side cross-sectional view of the embodiment of the present invention formed from FIG. 1 showing the assembly of the complementary top and bottom portions of the embodiment;

FIGS. 8 through 15 are additional side cross-sectional views of the wafer of FIG. 7 during successive steps of wafer fabrication;

FIG. 16 is a side cross-sectional view of the embodiments of FIGS. 7-15, showing the complementary top and bottom portions of this embodiment of the invention;

FIGS. 25a-28b illustrate side cross-sectional views of an embodiment undergoing successive steps of an alternative method of wafer fabrication;

DESCRIPTION OF PREFERRED EMBODIMENTS

Figure 7:
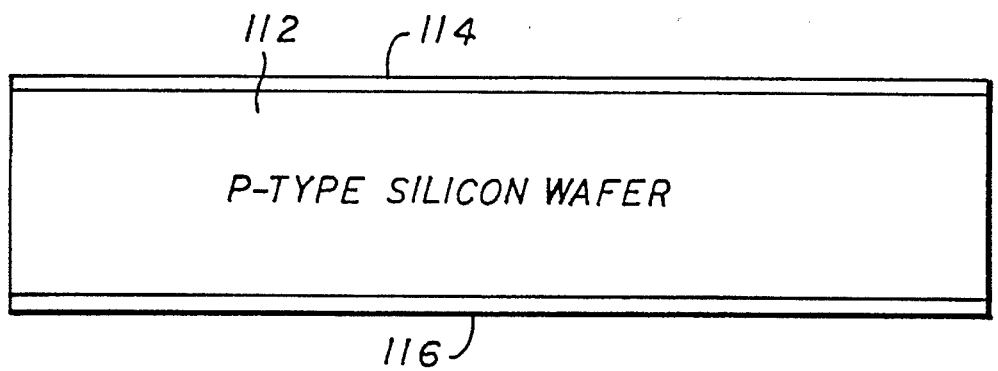
FIG. 7 is a side cross-sectional view of another embodiment of the present invention during fabrication.

The first embodiment of the present invention is shown in FIGS. 1-6. In the following description of the preferred embodiment of FIGS. 1-6, doping, flatness, and various dimensions of the structure is discussed.

These particular characteristics may be varied in accordance with the teachings of the present invention. Variations will result in different size components, and different electrical characteristics, where small variations will not impede operation of the device. Lastly, the following discussion teaches the present invention in the context of an accelerometer. It is clear to those skilled in the art, however, that the present invention is equally applicable to other related solid state instruments and devices.

Referring first to FIG. 1, there is shown a silicon wafer 12 which is doped with P-type material, preferably boron, to achieve a resistivity of 1 ohm-centimeter. Silicon wafer 12 is preferably a silicon wafer having a diameter of approximately 100 millimeters and is polished to a flatness of 10.0 micrometers and having a surface finish of 0.3 nm RMS.

Oxide layers 14 and 16 are formed on the front and back of silicon wafer 12. Oxide layers 14 and 16 are grown thick enough for a diffusion or implant mask operation that will follow.

Referring next to FIG. 2, the oxide layer 14 is etched to provide openings for an N-type diffusion and for alignment marks to be placed on the back side of the silicon wafer 12. Front oxide layer 14 is divided, conceptually, into three oxide areas 18, 20, and 22. In reality, this is one continuous oxide film with small openings etched into it. An N-type dopant 28 and 30, such as phosphorus, is then diffused through openings 24 and 26 in the oxide layer.

Referring to FIG. 3, oxide layers 16, 18, 20 and 22 have been stripped or etched away and new oxide implant mask segments 32 and 34 are located over N-type doping areas 28 and 30. Oxygen 36 is implanted to form a buried layer beneath the surface of silicon wafer 12 adjacent N-type portions 28 and 30, through a process known commercially by the acronym, "SIMOX."

The silicon wafer 12 is then heated to anneal the silicon and form a buried oxide layer from the implanted oxygen 36. Oxide layers 40, 42 and 44 are located beneath the surface of silicon wafer 12 and are covered by a silicon layer identified as 46, 48 and 50. N-type doped areas 28 and 30 separate oxide layers 44 and 42, and 42 and 40, respectively.

The exact thickness of silicon material 46, 48 and 50 is not critical, but the silicon layer must be continuous and crystalline, and must be thick enough to survive the pre-epitaxial cleaning and surface oxide removal, so as to allow an additional layer of silicon to be epitaxially grown on top of silicon wafer 12.

According to FIG. 5, additional epitaxial layers 60, 62 and 64 are grown above the buried oxide layers 40, 42, and 44. The epitaxial silicon layer is doped with a P-type dopant such as boron. The doping of the P-type material gradually decreases away from the oxide layer towards the surface of silicon wafer 12 to allow subsequent N-type doping for use in forming selectively non-etching regions 67 and perimeter of 62.

Trench 68 and guard trenches 72, shown in FIGS. 5 and 6, are electrochemically etched. Openings 66 adjacent hinges 67 are also electrochemically etched. Then a blanket P-diffusion layer covering the surfaces and hinges is deposited to convert etch protected, lightly N-type regions back to P-type. The etching of the openings 66 is accomplished from the side, with the changes in the doping assisting in controlling the etching zones.

As compared to FIG. 6, the wafer of FIGS. 1–5 has been cut in half. The surfaces of the wafer are hydrated using a mixture of water, hydrogen peroxide and ammonia to form silanol groups on the surfaces. Once hydrated, the complementary surfaces of the wafer are aligned, and will bond in place. In order to bond, the wafers must be placed against each other with clean flat facing surfaces. Any particles present will inhibit bonding of the complementary wafer portions. Once assembled, the composite wafer is annealed at approximately 1100° C. for five hours. During the annealing process, oxygen, hydrogen are driven out of the composite wafer. The five-hour annealing is sufficient to drive the surface P-layer deeper than the N-diffusion zone 30 adjacent to hinge 67.

Wire bond vias 84 are then anisotropically etched, creating sloped walls 78 and 80. A shadow masked TiAu layer (not shown) is typically deposited as an electrical contact surface so that wire 74 may be bonded thereto. Wire 74 may then be bonded at point 82 in the cavity. The oxide layer 42 is then etched away leaving openings 70 and 71 surrounding proofmass 62. The composite wafer is sawn to chips prior to etching, then centrifuged to remove etchant. Alternatively, the composite wafer can be purged with deionized water and T-butyl alcohol, and then freeze dried in vacuo and completed.

In the embodiment shown, oxide regions 44, 40 and 76 are each approximately 0.5 microns thick. Spaces 70 and 71 are also approximately 0.5 microns in height, as they are formed by selectively etching away the oxide 42 present in those areas. The capacitor formed by the guard ring frame and surrounding fixed electrodes has a dielectric constant of four in the embodiment shown. The capacitance of the substrate is reduced by regions 72. The proofmass has an overall thickness of approximately 70 microns, as each section 62 is approximately 35 microns thick prior to bonding the complementary surfaces together. Similarly, the distance between oxide layers 40 and 76 will be approximately 70 microns.

Figure 8:
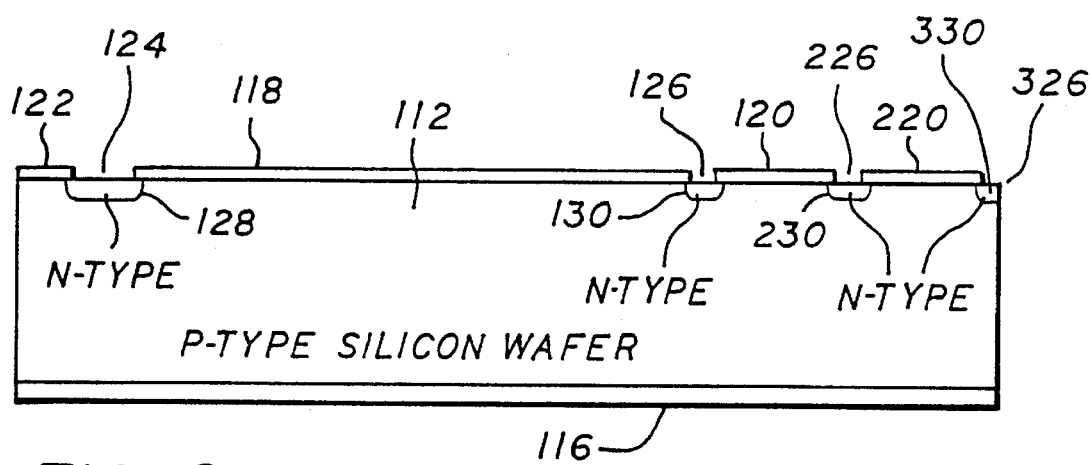

An alternative embodiment of the configuration shown in FIGS. 1–6 is illustrated in FIGS. 7–17. A similar starting material, P-type doped silicon substrate 112 has oxide layers 114 and 116 formed on the front and back, with these layers being thick enough to form a diffusion or implant mask. The starting material is the same as in the earlier discussed embodiment. Referring to FIG. 8, oxide layer 114 is patterned for N-type ion implantation or diffusion, and alignment marks are patterned onto the back or bottom oxide layer 116 of the substrate 112.

The pattern refers to openings 124, 126, 226 and 330 through which phosphorous or other N-type material is diffused. After diffusion this oxide layer 122,118, 120, 122, and 220 is stripped and a new oxide layer is deposited. This new oxide layer is approximately 5,000 Angstroms thick. A thin CVD silicon nitride layer approximate 500 Angstroms deep is then deposited on the surface of the new oxide layer.

Figure 9:
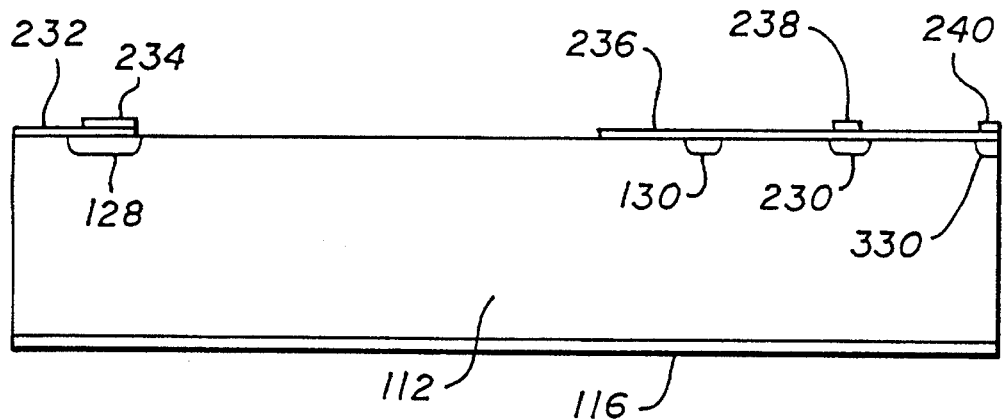

Referring to FIG. 9, portions of the silicon nitride layer then effectively removed, leaving a patterned layer of silicon nitride in locations 234, 238 and 240. This patterned nitride layer is located on top of a patterned oxide layer 232 and 236.

The exposed areas of the substrate are then etched using potassium hydroxide silicon etch to a depth of approximately 35 micrometers, as shown in FIG. 10. This creates a channel 242 between patterned oxide sections 232 and 236. Sloped walls 244 and 246 representing (111) crystallographic planes surround channel 242.

Referring to FIG. 11, the oxide layer is then stripped and potassium hydroxide used to etch the newly exposed surface and channel 242 an additional 2 micrometers. The remaining structure consists of a nitride layer in separate sections 234, 238 and 240 immediately above oxide layer sections 232 and 236. These layers are located above the N-doped material which was diffused or implanted to the substrate earlier. This N-type material is in locations 128, 230, and 330. The N-type material at location 130 was not protected by a nitride layer and was partially etched by the potassium hydroxide etch.

The nitride and oxide layers are then removed and a CVD oxide layer deposited and patterned as shown in FIG. 12. This layer is approximately 8,000 Angstroms thick and is shown in locations 260, 262, 264 and 266. The photoresist mask is preferably applied by a spray lithography process to avoid step coverage problems. A deposited oxide is used to avoid surface steps that could occur if a thermally grown oxidation was used due to differences in oxidation rates between the substrate and N-doped regions, 128, 130, 230, 330. The oxide layer is then used to mask an ion implanted oxide layer. The implanted oxide layer is annealed at approximately 1300° C. for five hours and will be present beneath the surface of the substrate wherever the CVD oxide was not present. This is shown as oxide layers 270, 272, 278, 274 and 276 in FIG. 13.

Referring to FIGS. 14–15, the oxide which was used as a mask during the ion implantation is removed and a P-type epitaxial layer is grown on the top of the substrate. The epitaxial layer is approximately 35 micrometers thick and has a conductivity of 0.1 ohm-centimeters. This epitaxial growth fills in channel 242. The epitaxial layer on top of the substrate is then lapped or ground away until the oxide layer begins to show. The oxide layer will show first at tab 280. The epitaxial grown layer is thus divided into several different sections 292, 294, 296, and 298.

At this point, the wafer is sliced in half and the complementary wafer surface is aligned, hydrated and bonded, forming a composite wafer. The composite is annealed at approximately 1100° C. for five hours. In the embodiment shown in FIG. 16, the top portion of the composite wafer is shown with a proofmass section 295 complementing proofmass section 294. In order to avoid having a bond line or seam located in the center of the hinge, only a single hinge 296 will be formed with this embodiment.

Figure 17:
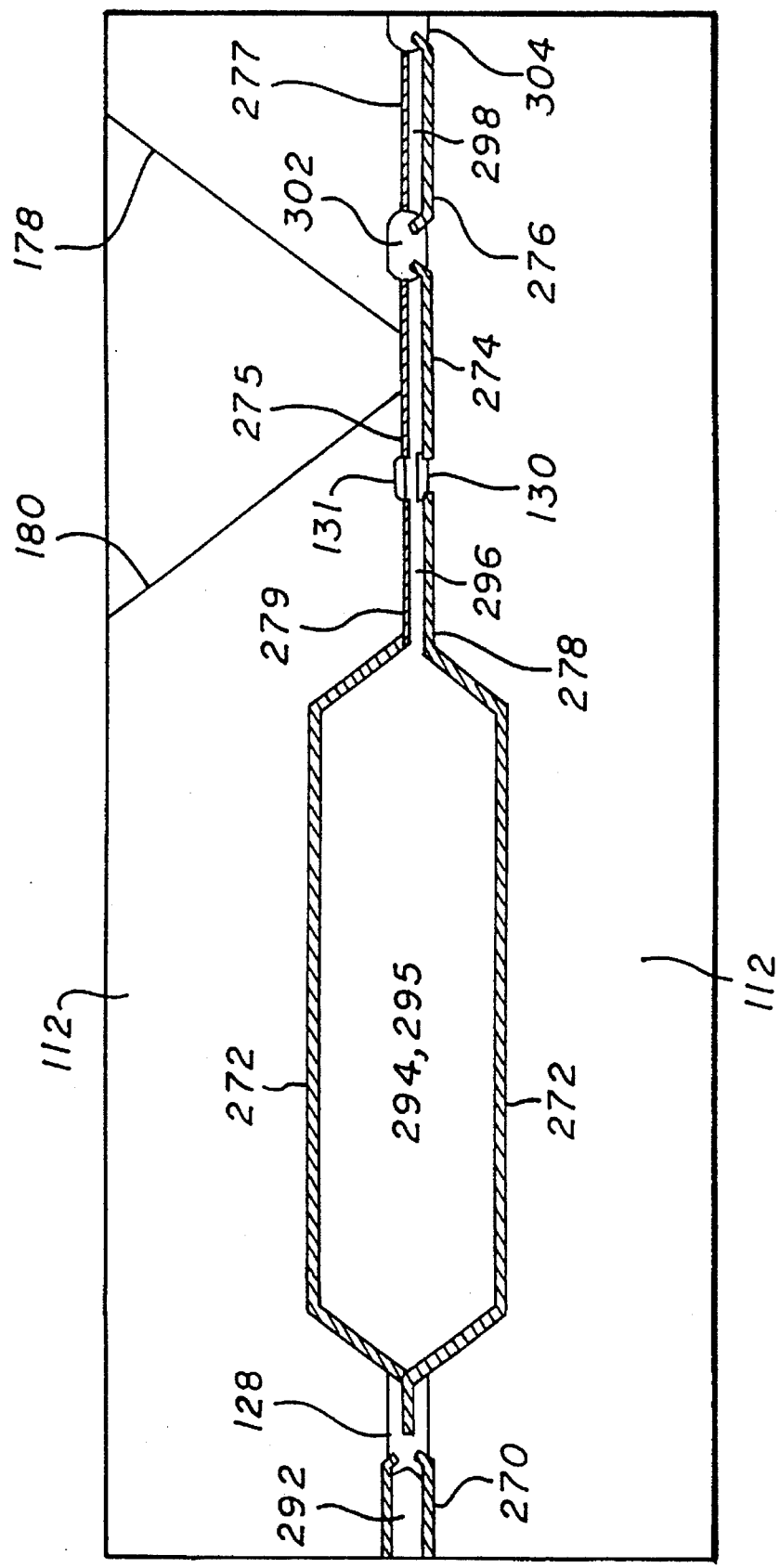
FIG. 17 is a side cross-sectional view of the embodiment shown in FIG. 16 after the complementary portions have been mated.

Once assembled as shown in FIG. 17, proofmass sections 294 and 295 are joined forming a single proofmass 294, 295 surrounded by channel 272. Hinge 296 is sandwiched between oxide layers 278 and 279. N-type doped material 130 and 131 abuts the edge of pendulum arm 296.

Figure 18:
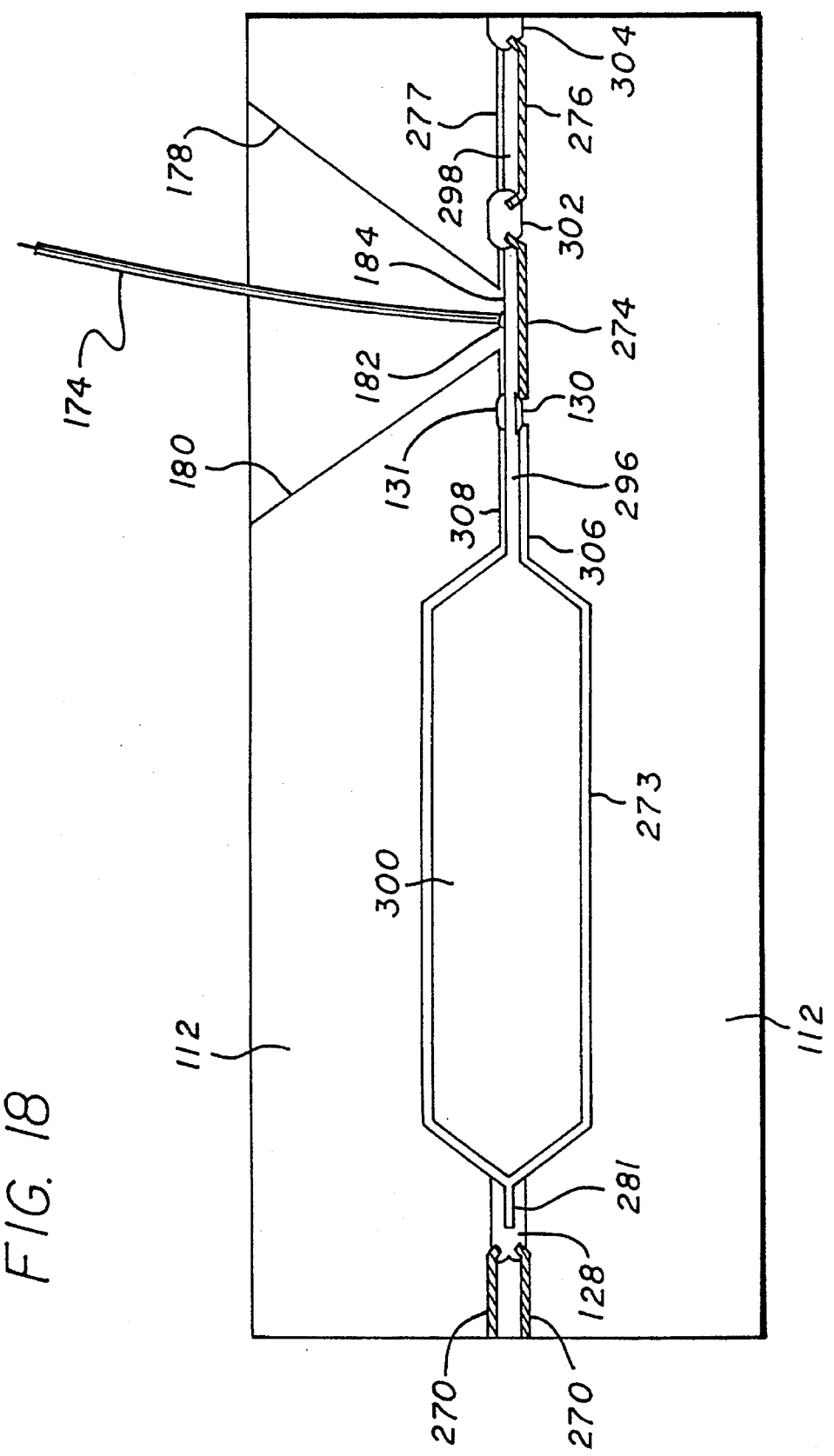
FIG. 18 is a side cross-sectional view of the embodiment shown in FIG. 17 after wire bonding.

Oxide layer 275 is removed, and wire bond via 178 is etched into the composite substrate, as shown in FIG. 18. This allows wire 174 to be bonded at point 182 to the extension of P-type material 184 of pendulum arm 296. Oxide layer 274 prevents the stray flow of current through the composite substrate. In FIGS. 17 and 18, N-type material 302 and 304 provide further electrical isolation, as do oxide layers 276 and 277.

Oxide layers 272 are removed by selective etch, then the gaps are cleared by centrifuging to remove etchant. Alternatively, the gaps are purged and then freeze-dried in T-butanol. A shadow mask is used to deposit a layer of metal on surface 184 to allow wire bond 182 to become attached to the substrate.

Both the above-described embodiments create a pendulum having a precisely defined configuration located in between two silicon electrodes. The electrodes are precisely separated from the pendulum by a predetermined amount. By utilizing a single wafer and slicing the wafer in half to form the complementary top and bottom portions of the device, the distance between the pendulum and each of the electrodes on the side of the pendulum is kept uniform, reducing or eliminating undesired variations occurring when different wafers are used.

Alignment and assembly of the accelerometer of the present invention are accomplished while both portions of the wafer are solid, thereby minimizing any stress to the wafer, and preventing damage to the pendulum as a result of handling. The present invention also greatly reduces or eliminates the possibility that dirt, dust, or other undesired contaminants will be contained within the accelerometer. This ensures uniform operation, minimizes defects, and extends the usable life of the device.

The present invention also avoids the sharp edges of a cantilever as shown in Stewart. It is preferred to modify the design of the embodiment of FIGS. 1–6 to employ an unseamed hinge. The oxide layers which remain in the substrate surrounding the proofmass are used to block the flow of stray electrical current through the substrate. Additional trench guards 72 as shown in FIG. 6 may be employed to reduce capacitance from one fixed electrode to the other. Capacitance from fixed electrode to guard is also reduced compared to a solid guard dielectric.

Referring to FIGS. 19–24, a preferred topography of the device is shown. The topography illustrated employs a square proofmass. It may be possible that a rectangular proofmass, having a length extending away from the hinges greater than the width of the proofmass may provide superior characteristics when employed in an accelerometer.

Figure 19:
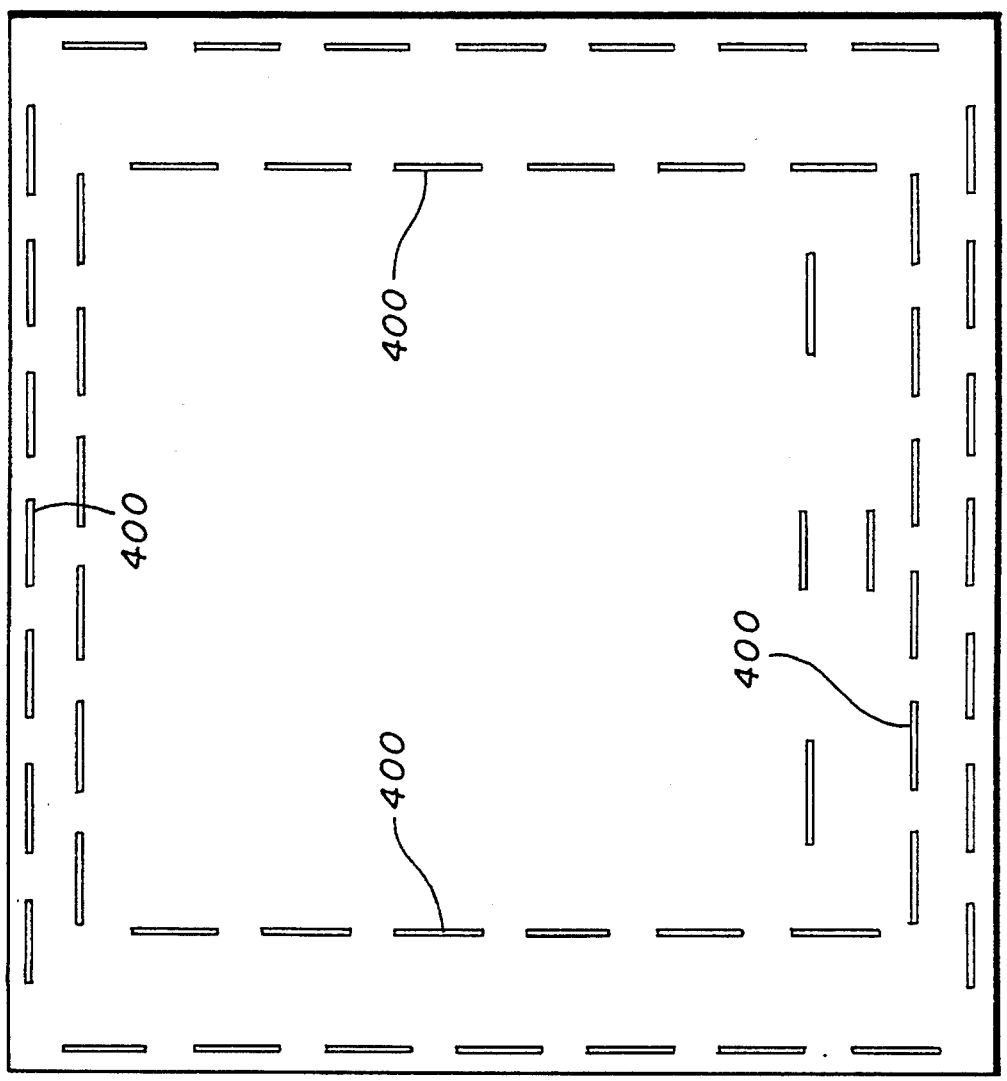
FIG. 19 is a top view of a diffusion layer mask of an embodiment of the present invention.

Referring to FIG. 19, a mask having openings 400 is shown which is suitable for diffusing or implanting the N-type material 28, 30 as shown in FIG. 2 into the oxide coated substrate 12. This same mask may be used to deposit the new oxide layer 32, 34 over N-type regions 28, 38 as shown in FIG. 3. This protects the N-type regions during ion implantation of oxygen.

Figure 20:
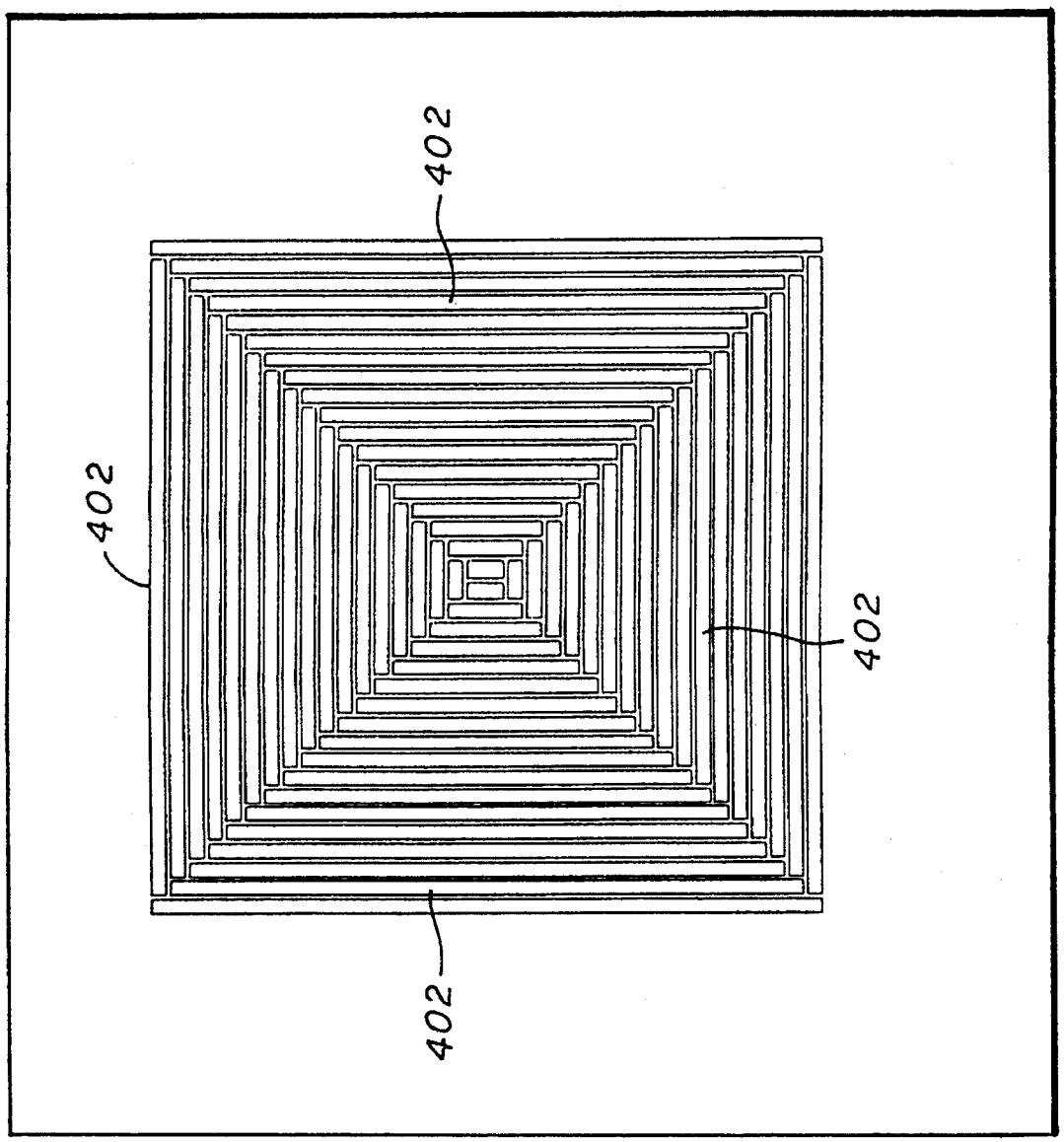
FIG. 20 is a top view of an etching mask for providing damping grooves in the embodiment of FIG. 19.
Figure 23:
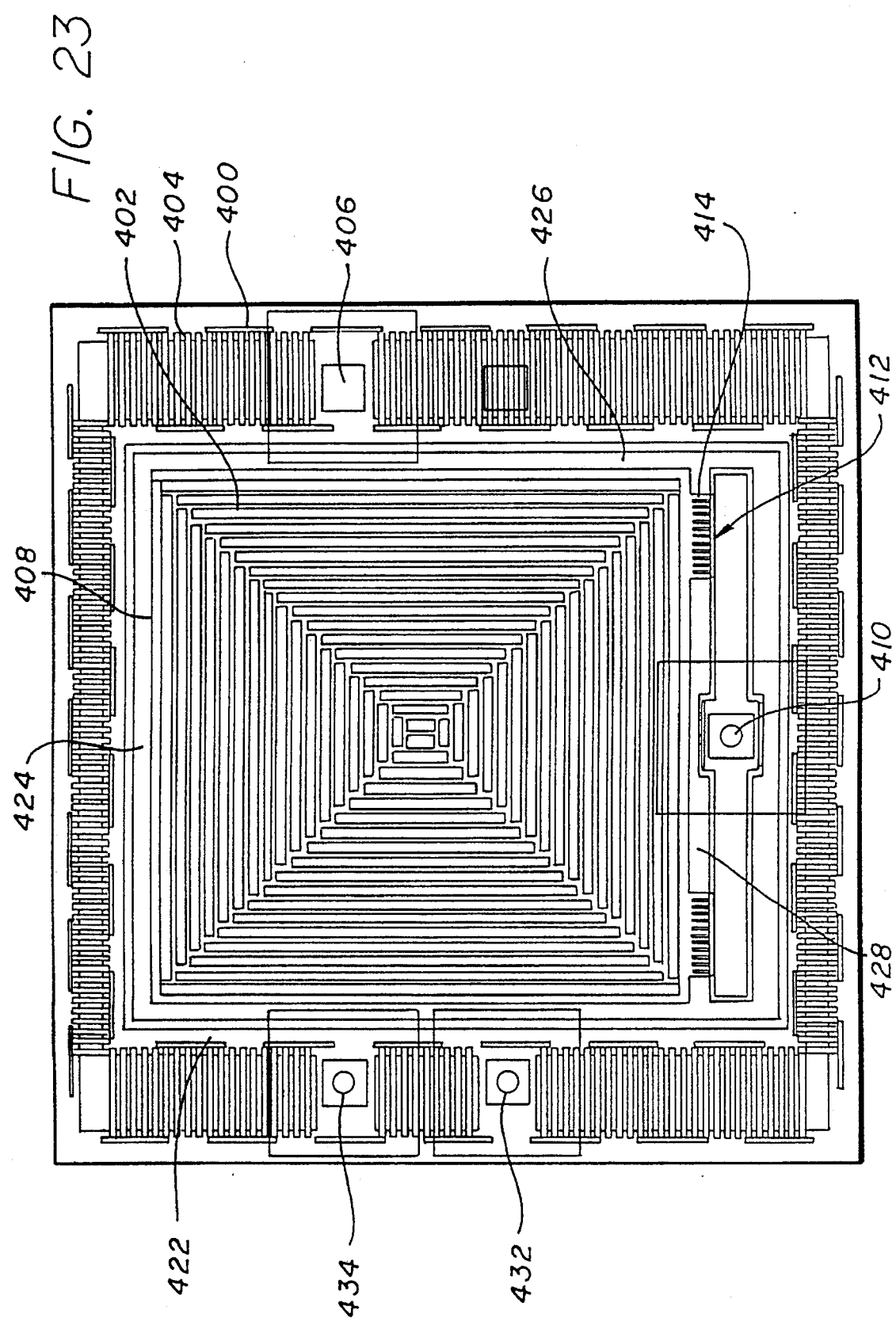
FIG. 23 is a top view of an overlay of the masks of FIGS. 19-22.

Referring to FIG. 20, a mask suitable for creating damping reduction grooves using a potassium hydroxide etchant. The damping grooves are etched on the (111) plane towards the buried oxide layer. The damping grooves are located on the proofmass. FIG. 23 shows the relative position of the damping grooves 402 on the proofmass.

Figure 21:
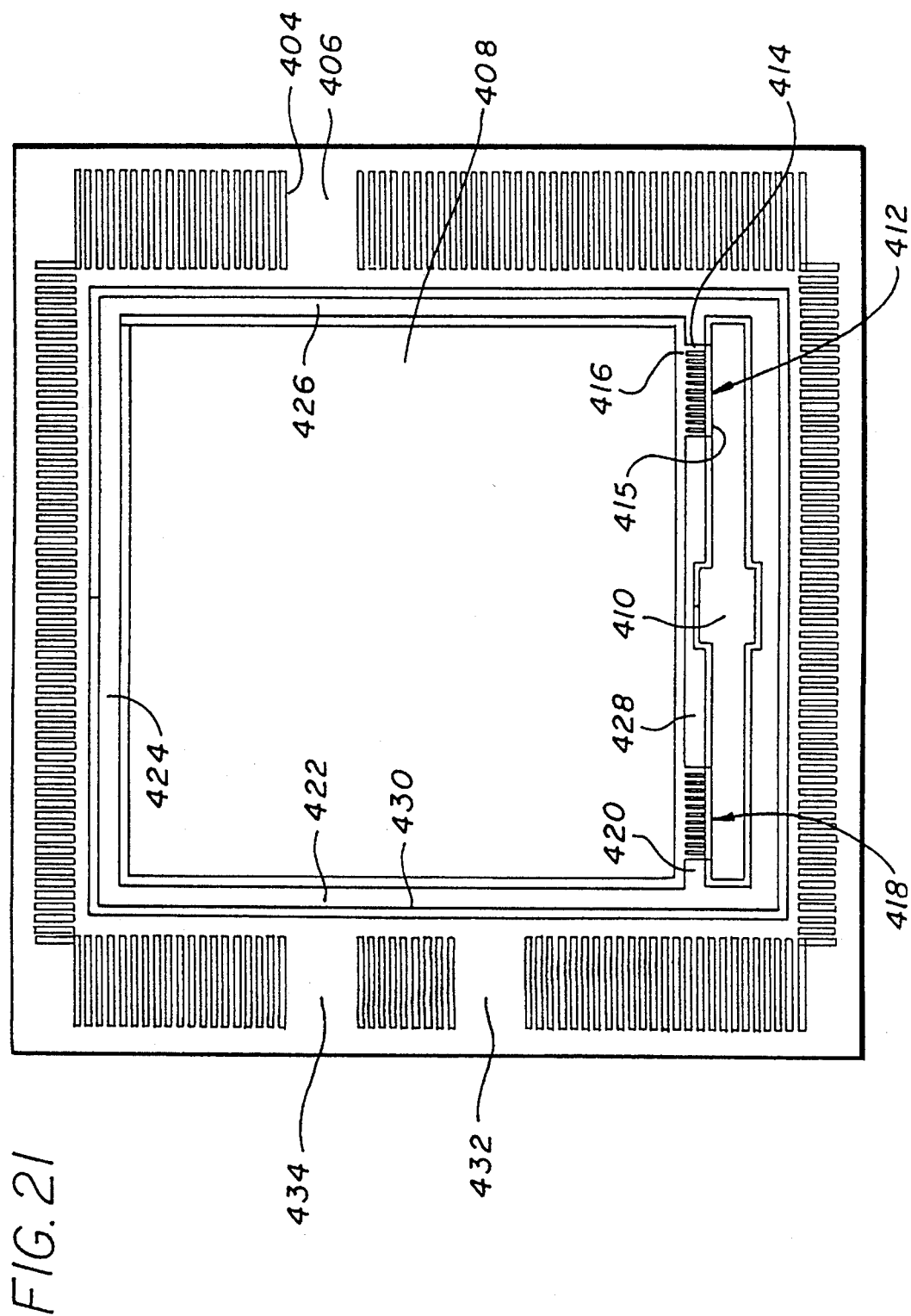
FIG. 21 is a top view of a diffusion mask for the embodiment of FIG. 19.

Referring to FIG. 21, additional masking is shown to create proofmass 408, hinges 412 and 418, and a surrounding support structure. Regions 422, 424, 426 and 428 represent areas which are to be removed to allow the proofmass 408 to move within the wafer. Tabs 404 will be N-type doped regions to protect them from etching during electrochemical dopant selective etch. These tabs are bridges extending over an undercut channel running beneath them terminating on the buried oxide below. When the two complementary halves of the wafer are aligned and bonded, the complementary bridges cover spaces between bridges on each wafer, thereby producing a shield that guards stray capacitance between the top and bottom fixed electrodes and results in only stray capacitance to ground. Regions 406, 410, 432 and 434 will be wire bonding locations. A metallization layer will be deposited in these areas before wire bonding occurs.

In the embodiment shown, there are two hinges, 412 and 418, located along one side of the proofmass 408. The hinges are slightly inset from the outer edge of the proofmass. Region 420 is shown between the edge of hinge 418 and the edge of proofmass 408. A similar region is located between hinge 412 and the opposite edge of proofmass 408.

Hinge 412 consists of a reinforcing region 415 located at the base of the hinge. A number of fingers 414 separated by spaces 416 make up the remainder of the hinge. In one embodiment, hinge 412 is approximately 400 microns wide. The use of slotted hinges allows etching solution to go through the slots in between fingers 414. This ensures that the entire area beneath the hinge has all of the undesired material removed. Without slots 416 in place, the etchant would only have access to the underside of hinge 412 around the edges of the hinge. This would result in a substantially longer etch time which may be damaging to other components of the device, or would leave residual material located beneath the hinge which would impede operation of the hinge.

Figure 22:
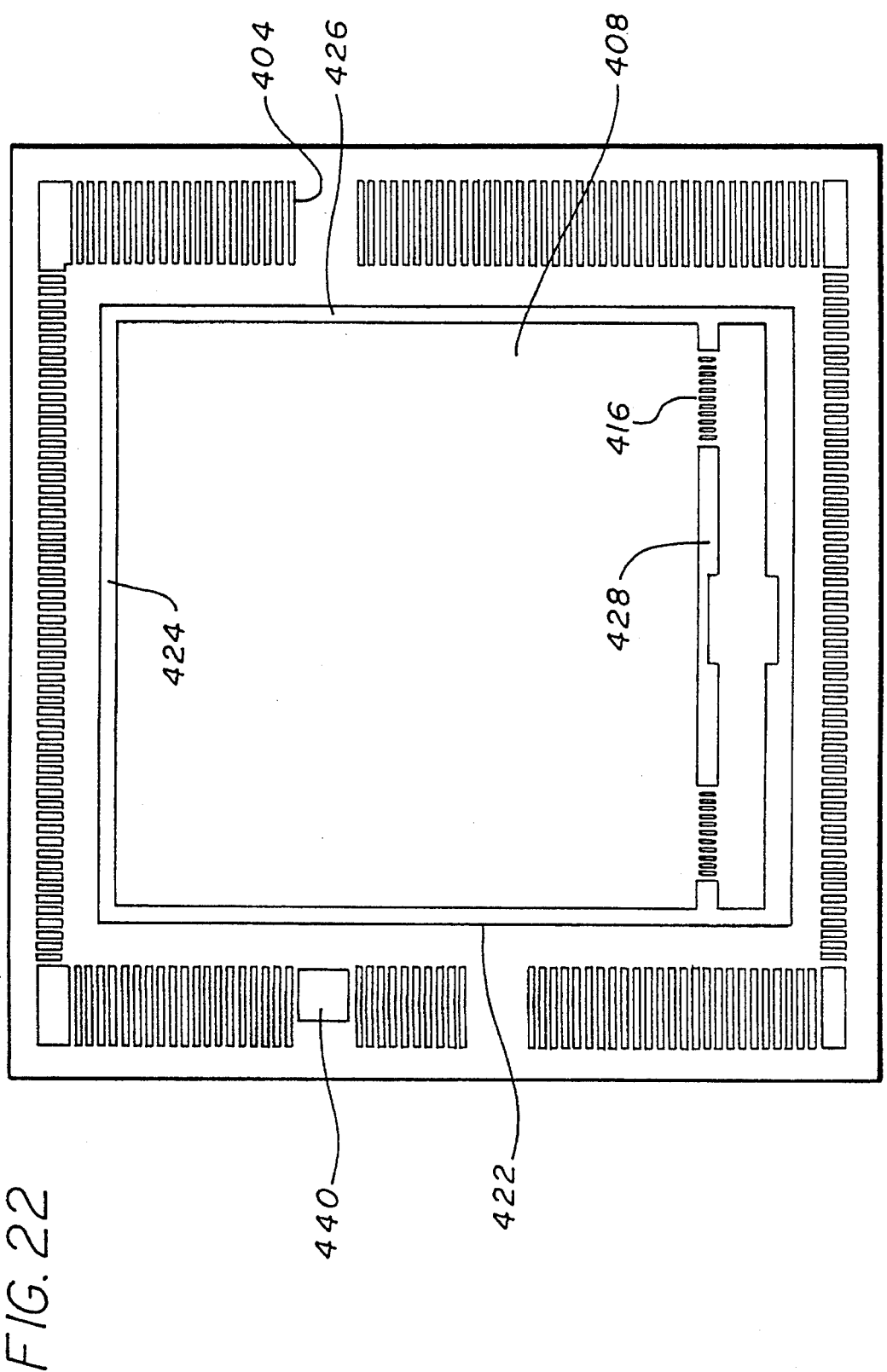
FIG. 22 is a top view of the hinge etch mask for the embodiment of FIG. 19.

FIG. 22 shows the relative position of the hinges, proofmass 408 and tabs 404. Opening 440 is formed in the epitaxial layer to allow access to the silicon oxide layer located beneath proofmass 408. This opening 440 allows the silicon oxide to be selectively etched, leaving only the unetched surfaces of proofmass 408 and the surrounding structure. A via is located above this opening and, after oxide removal, the opening serves as a wirebond port for contacting the lower fixed electrode from the top surface.

FIG. 23 is a composite mask view, showing the top surface of substrate 12. The relative locations of hinges 412, proofmass 408, tabs 404, damping grooves 402, and other features, are shown in relationship to each other in this figure.

Figure 24:
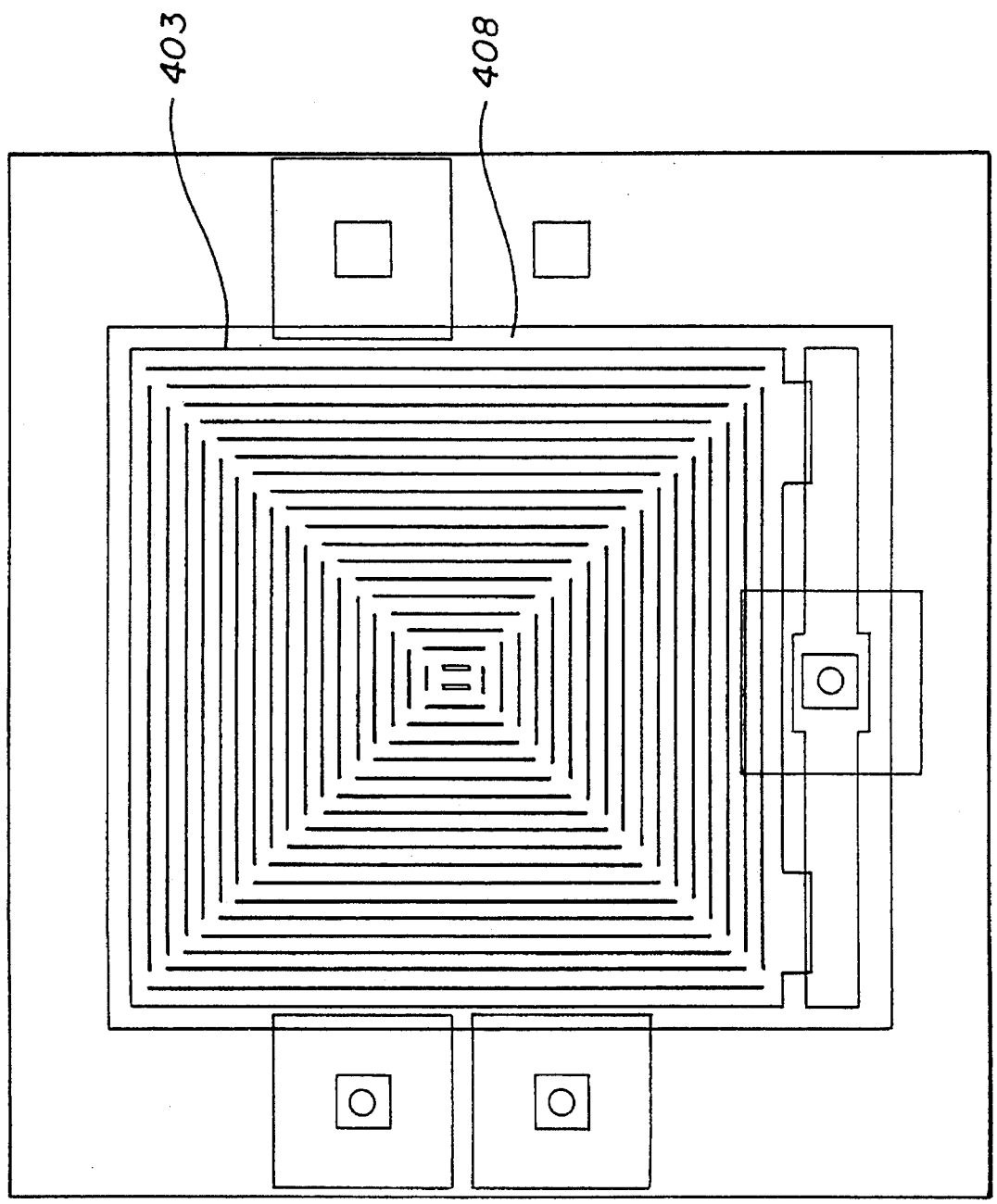
FIG. 24 is a composite view of the embodiment of FIG. 19 illustrating damping grooves as they intersect the bottom surface of the proofmass.

FIG. 24 shows the location of damping grooves 403 which are left in the top surface of proofmass 408 after damping groove mask of FIG. 20 has been employed. The damping grooves 403 permit air to escape from the bottom or top of the proofmass 408. More precisely, the damping grooves 403 eliminate adverse effects that may be created as a result of air rushing around the edge of the proofmass 408. This insures that the proofmass 408 is free to flex without being impeded by the fluid flow of air. Preferably, the space surrounding proofmass 408 is flooded with an inert gas such as nitrogen. This prevents any degradation of the proofmass or surrounding portions of the device. It is also possible to tailor the damping by sealing the device in a reduced pressure atmosphere.

In the embodiment shown in FIGS. 19–24, the proofmass is approximately 3 millimeters by 3 millimeters. With this configuration, two hinges, 400 microns each, are suitable to support the structure of the proofmass. It is recognized that the aspect ratio of the proofmass may be changed or the proofmass made larger or smaller depending on the particular applications. The width of the hinges 412 and 418, as well as the width of fingers 414 and slots 416 may be varied to create stiffer or more flexible hinges, depending on the requirements of the accelerometer design.

In another embodiment, the present invention provides an alternative method of fabricating a solid state instrument such as an accelerometer. The alternative method is known as the bond and etch-back method, and is shown in successive steps in FIGS. 25–32. It is noteworthy that FIGS. 25–32 show alternative steps to that shown in FIGS. 1–6.

The bond and etch-back method is similar to the methods described above in that the wafer is processed, sawed in half, and then bonded again wherein the complementary halves are joined to obtain the finished accelerometer. The bond and etch-back method, however, allows use of phospho-silicate glass (PSG), a doped 7 percent phosphorous glass. This oxide material etches about ten times faster than other oxides known in the art. Thus, the subsequent etching steps are greatly facilitated. Also, PSG is easier to control in terms of its thickness than a comparable oxide used in the SIMOX process, described above. For example, present technology only permits growth of 0.5 micron of thickness using the SIMOX method; in contrast, the bond and etch-back method can deposit a PSG layer or grow an oxide layer of one micron on the substrate. Ultimately, the thickness of the oxide layer determines the size of the gap between the proofmass and the surrounding walls.

As seen in FIG. 25(a), the bond and etch-back method begins with a top P-type silicon substrate 500. This is a commercially available unpatterned wafer with a continuous buried oxide produced by oxygen ion implantation (SIMOX), or a commercially available bonded wafer having a buried oxide. A layer of P-type silicon is epitaxially grown on the wafer surface. This "P-epi" layer 504 becomes the proofmass, and is at this stage one-half of the desired thickness of the finished proofmass. Preferrably, the P-epi layer 504 is 35 microns thick, as grown in the SIMOX process above. Because the P-epi layer 504 is so thin and consequently fragile, the top P-type substrate 500 is needed to function as a handle for manipulation of the entire wafer during processing. The P-epi layer 504 is preferably a P-type, boron doped, epitaxial silicon.

FIG. 25(b) shows a cross-sectional view of a substrate that is the complementary half of the substrate shown in FIG. 25(a). In particular, FIG. 25(b) shows a cross-section of a bottom P-type silicon substrate 506 having a PSG or thermal oxide layer 508 deposited or grown, respectively, thereon. A nitride masking film 510 is attached to the other face of the bottom P-type substrate 506.

Figure 26A:
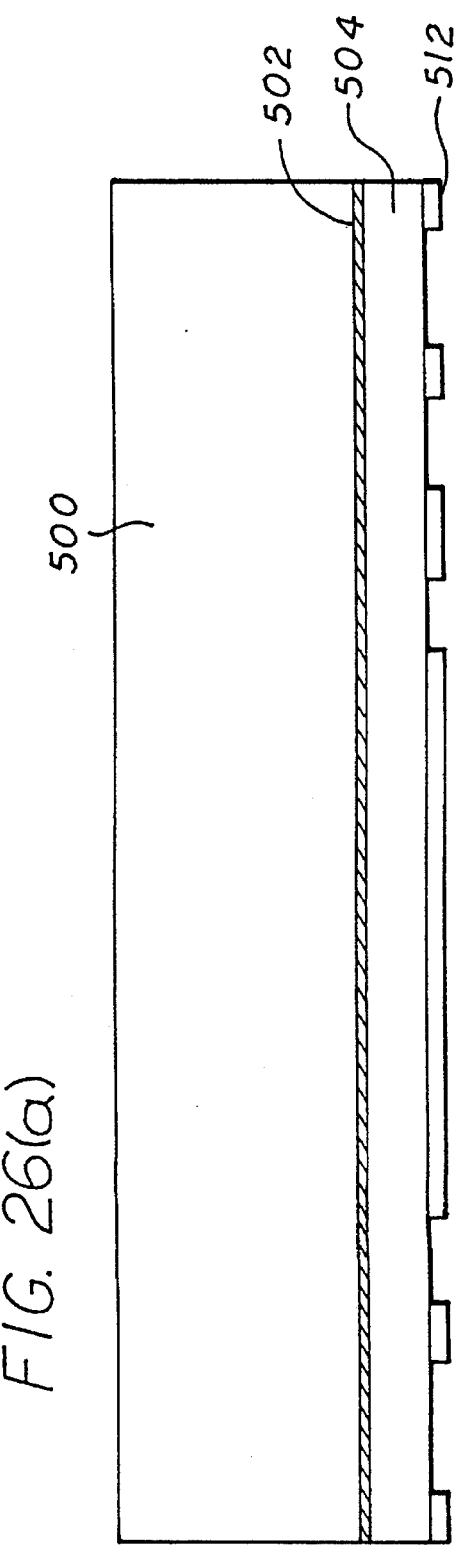
Figure 26B:
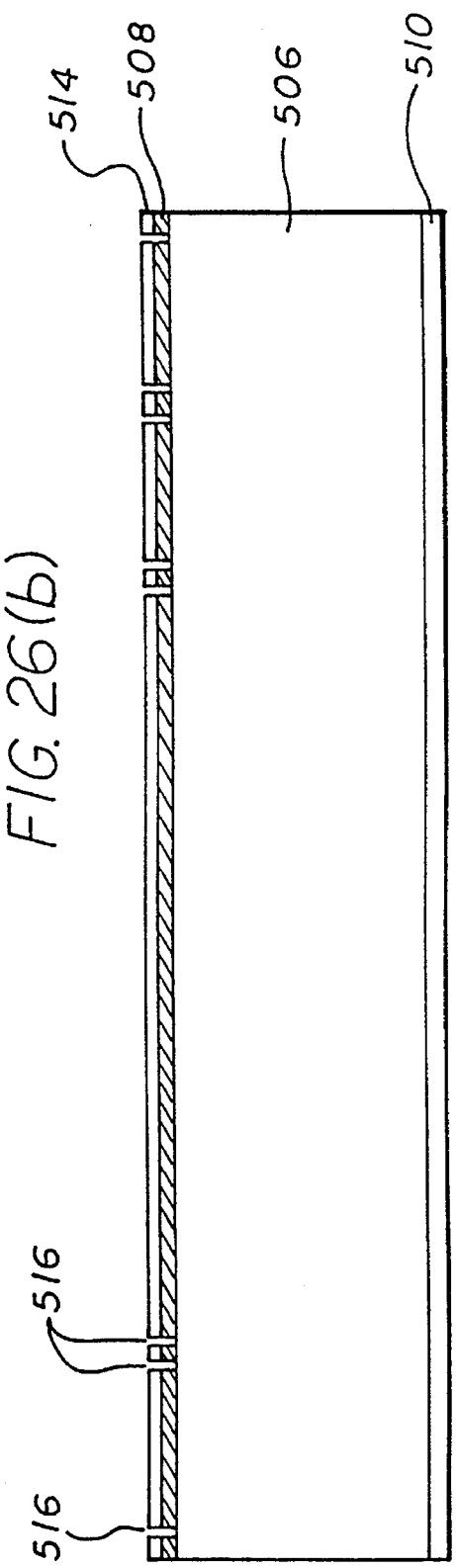

Through chemical vapor deposition, a nitride pattern 512 is deposited on the P-epi layer 504, as seen in FIG. 26(a). The nitride pattern 512 is used as an etch mask in subsequent steps. In FIG. 26(b), a photoresist pattern 514 having trenches 516 therein is laid over the PSG or thermal oxide layer 508. Through a reactive ion etch process, the vertical trenches 516 permit certain portions of the PSG or thermal oxide layer 508 to be etched away down to the P-type silicon substrate 506.

In FIG. 27(a), a thermal oxide layer 518 is grown within the windows or openings in the nitride pattern 512. The oxide is etched away in areas to define the proofmass outline after subsequent KOH silicon etch. The presence of the grown oxide layer 518 prevents the hinge and guard diaphragm areas from etching in KOH, while the trench between the proofmass and frame is etched to a depth equal to the desired hinge thickness. At this point, the oxide is stripped away and silicon etching occurs in all areas not protected by silicon nitride. The hinge thickness preferably ranges from 2 to 5 microns.

FIG. 27(b) shows the sputter deposit of amorphous silicon over the resist pattern 514 of FIG. 26(b). The amorphous silicon 520 covers the resist pattern 514 as well as filling into vertical trenches 516. Thereafter, the resist pattern 514 is removed, simultaneously lifting off excess amorphous silicon 520 not sputtered within the trenches 516. Now the trenches 516 are lined with amorphous silicon 520, which serves as a seal around the oxide islands 550.

In FIG. 28(a), potassium hydroxide (KOH) is used to anisotropically etch the P-epi layer 504 in the openings of the nitride pattern 512. As seen in the drawing, for the same time of exposure to KOH etch, the completely bare areas of the P-epi layer 504 has more material removed than the areas of the P-epi layer 504 covered by the grown oxide layer 518. This is the result of the headstart the KOH etch has in the bare areas of the P-epi layer 504. The hinge 522 for the proofmass half 524 and the guard 526 can now be identified as shown. The hinge 522 and guard 526 has a thickness as determined by the headstart thickness of the grown oxide layer 518.

Further, the outline of the proofmass half 524 has been defined; for example, the top 528 of the proofmass 524 can be seen wherein the P-epi layer 524 has been etched completely to the buried oxide etch-stop 502 to form a trench 530. Conceptually, although not shown, the etched trench 530 outlines the proofmass half 524.

The complementary bottom substrate does not receive any processing at this stage, as seen in FIG. 28(b). Thus, FIGS. 27(b) and 28(b) are identical.

Figure 29:
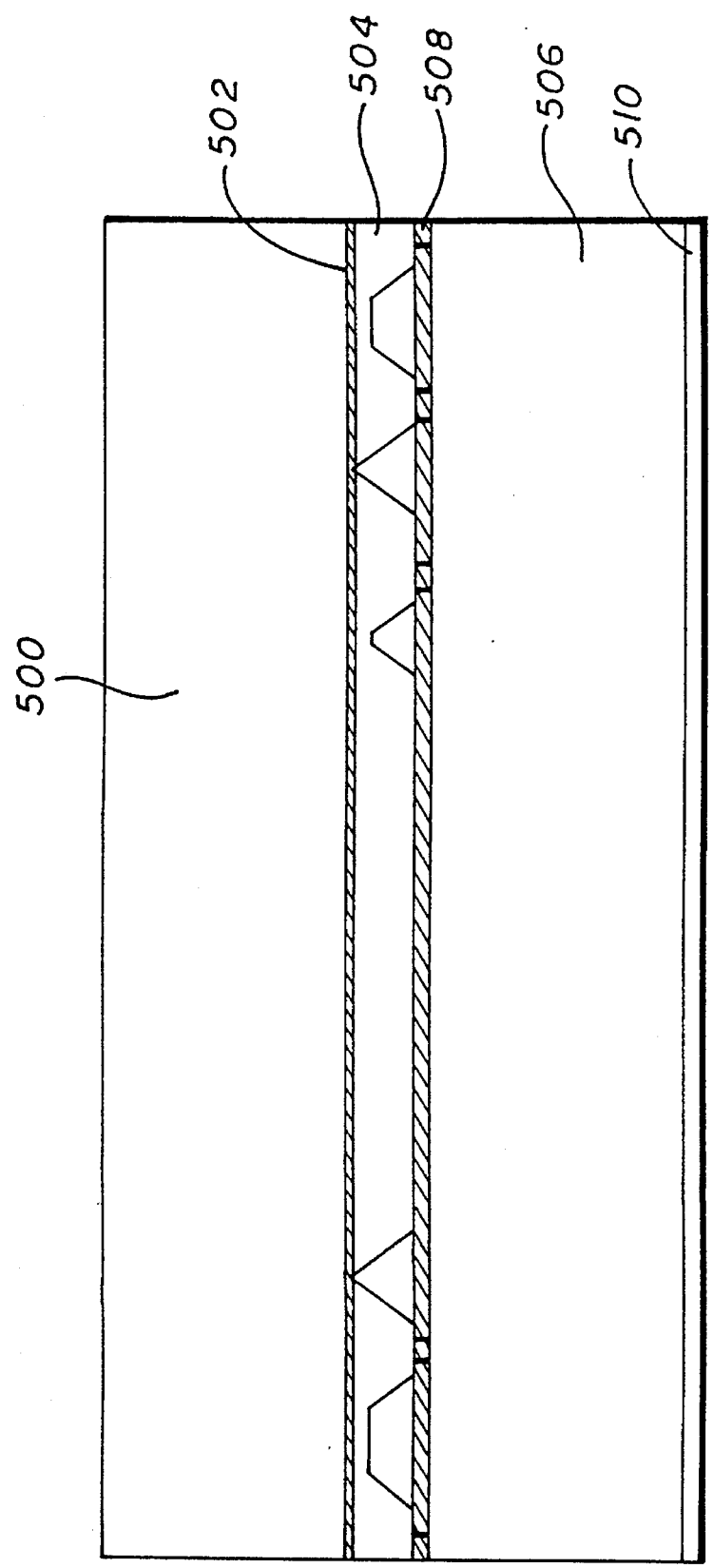
FIGS. 29-30 illustrate where the complementary top and bottom wafers are bonded and then etched.

Next, the nitride pattern 512 is stripped off of the P-epi layer 504. The now bare silicon surface is hydrated with a mixture of water, hydrogen peroxide and ammonium hydroxide. The wafer of FIGS. 28(a) and (b) are aligned and silicon fusion bonded as shown in FIG. 29. The bonded wafers are then annealed in a procedure described in the SIMOX process above.

Figure 30:
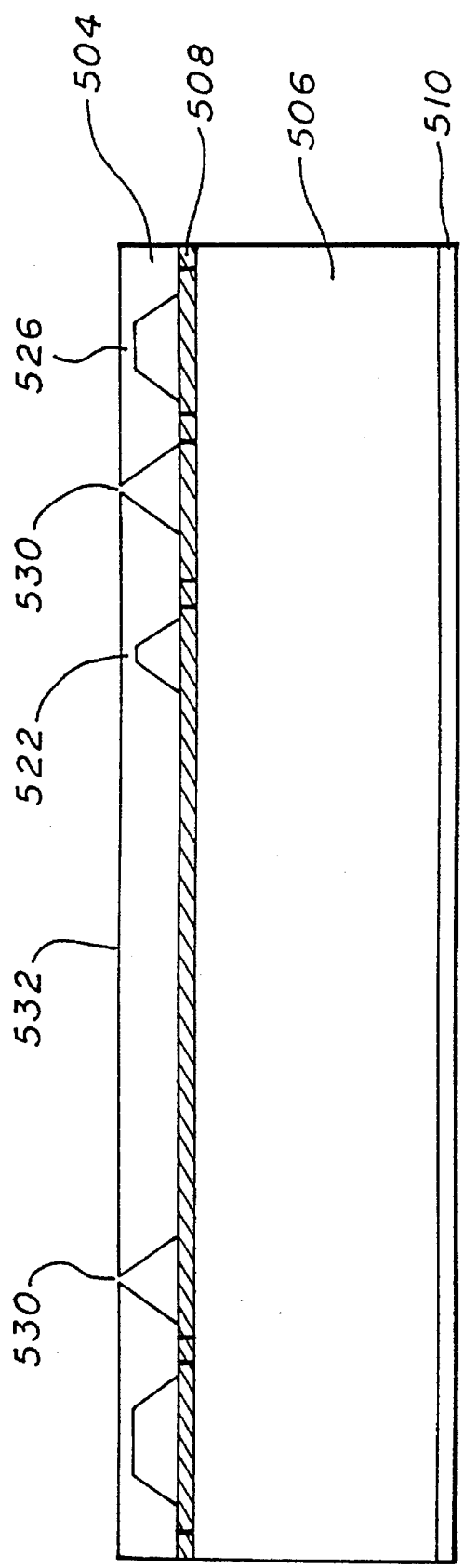

The top P-type substrate 500 previously used as a handle is no longer needed, and is removed by back grinding to a thickness of 100 microns, then etching the remainder to the oxide etch-stop with KOH. The bottom P-type substrate 506 is protected from the KOH etch by the nitride masking film 510. The KOH etch is stopped by the buried oxide etchstop 508 which is later selectively removed. The remaining bonded and stripped wafer 532 is represented in FIG. 30. The wafer 532 is then sawed into left and right halves. In the context of FIG. 30, the front part and the back part into the paper of the wafer 532 drawing are sawed in half. Pre-bond surfaces of each half are hydrated again with a mixture of water, hydrogen peroxide and ammonium hydroxide.

Figure 31:
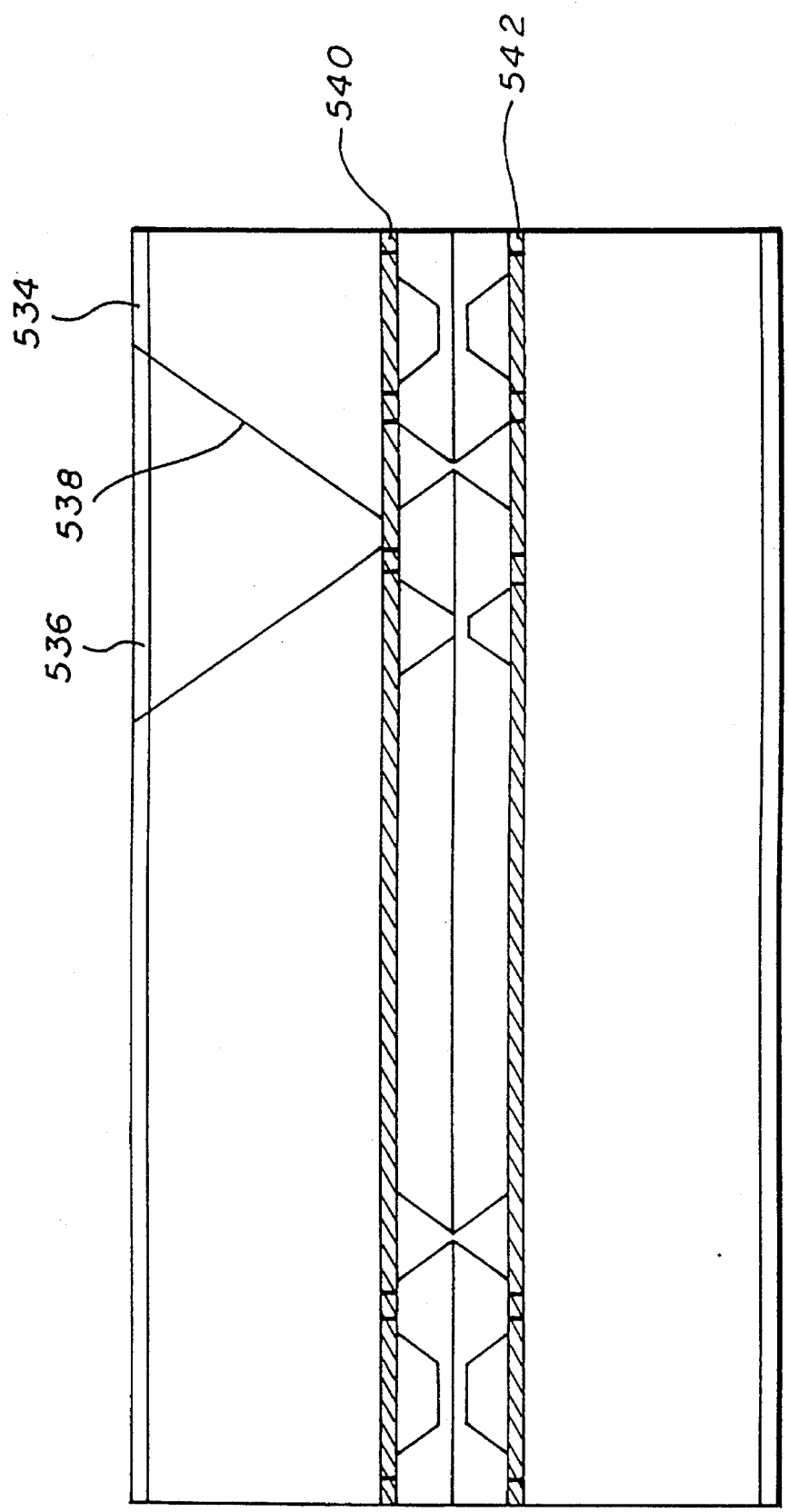
FIG. 31 shows the wafer of FIG. 30 after it is sawed in half and bonded to obtain the near finished proofmass still embedded in oxide.

As seen in FIG. 31, the halves are silicon fusion bonded together and annealed, both processes having been already described above. A hole 536 is photolithographically patterned through the now top nitride masking film 534 so that wire bond vias 538 can be anisotropically etched. The vias 538 are etched all the way down to the now top PSG or thermal oxide layer 540.

Figure 32:
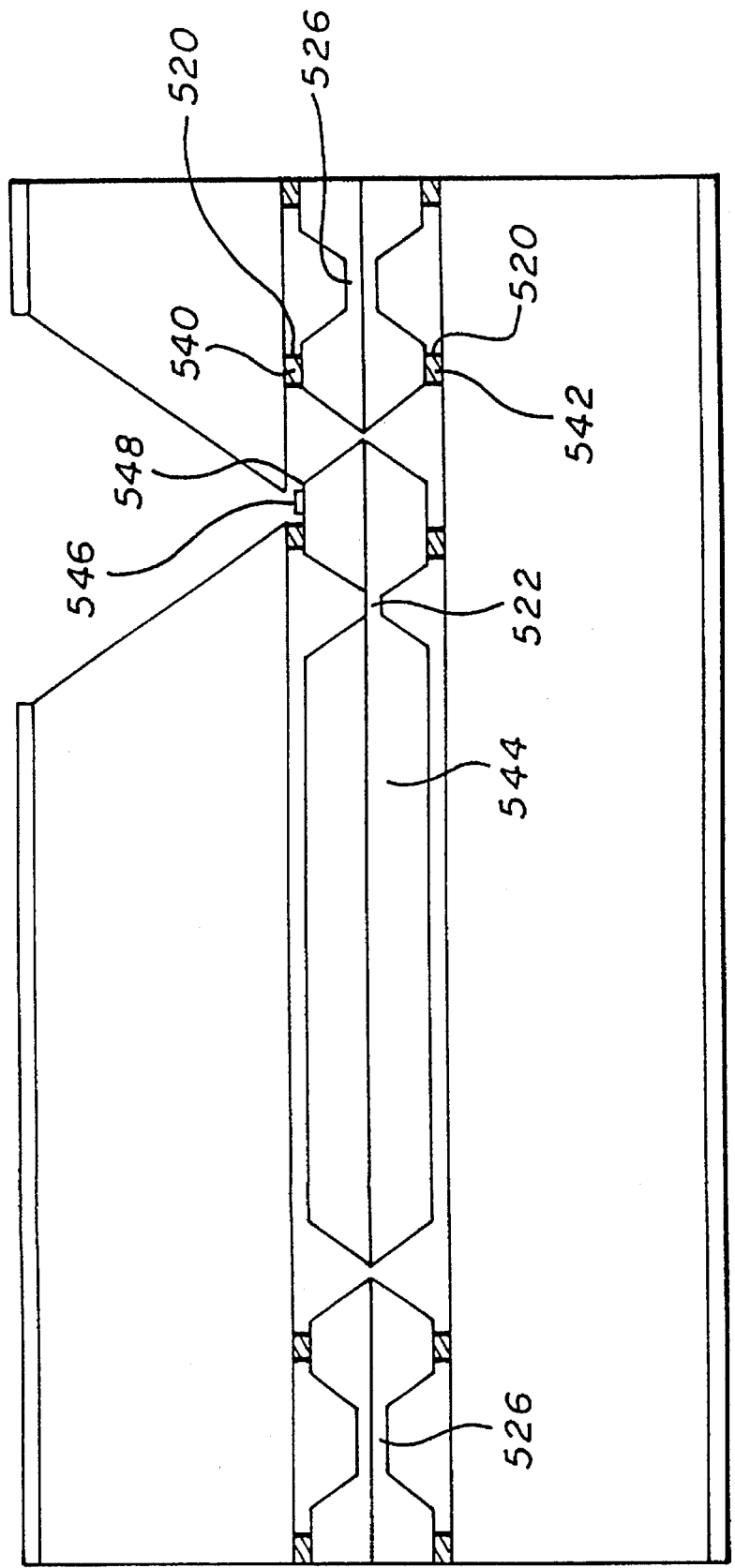
FIG. 32 shows the embodiment after the oxide has been etched away leaving the finished proofmass and hinge intact.

The now top and bottom PSG or thermal oxide layers 540 and 542, respectively, are etched away, leaving gaps around the completed proofmass 544. This is seen in FIG. 32. With the amorphous silicon seal 520 surrounding the PSG oxide layers 540, 542, the material is protected from the HF etch and remains intact. The structure of the hinge 522 and the guards 526 are now apparent.

The entire wafer is freeze dried in T-butanol, or alternatively sawn into chips and centrifuged as explained earlier. A shadow mask is used to deposit a layer of contact metal 546 on surface 548 to allow wire bonding to the substrate. The accelerometer is now complete, having a precisely formed pendulum or diaphragm positioned in between two silicon electrodes.

The present invention contemplates an alternative embodiment method of attaching an epitaxial silicon layer to an oxidized, silicon on insulator (SOI) substrate wafer, wherein the former is transferred to the latter through a bond and etch-back processes described above. Silicon on insulator wafers find wide application to sensor devices such as accelerometers. One advantageous way to fabricate microstructures such as an accelerometer requiring a small, controlled gap is processing the SOI wafer through wafer bonding, and then removing the oxide beneath the transferred epitaxial layer by etching.

One drawback of the process is the difficulty in anchoring parts of the epitaxial layer to the substrate so that the epitaxial layer parts remain fixed after the oxide is etched away. Importantly, the structure used for attachment must not be attacked or etched away during the sacrificial etch of the oxide layer by hydrofluoric (HF) acid, which complicates the process. The present invention provides a process that overcomes the foregoing difficulty.

Figure 33:
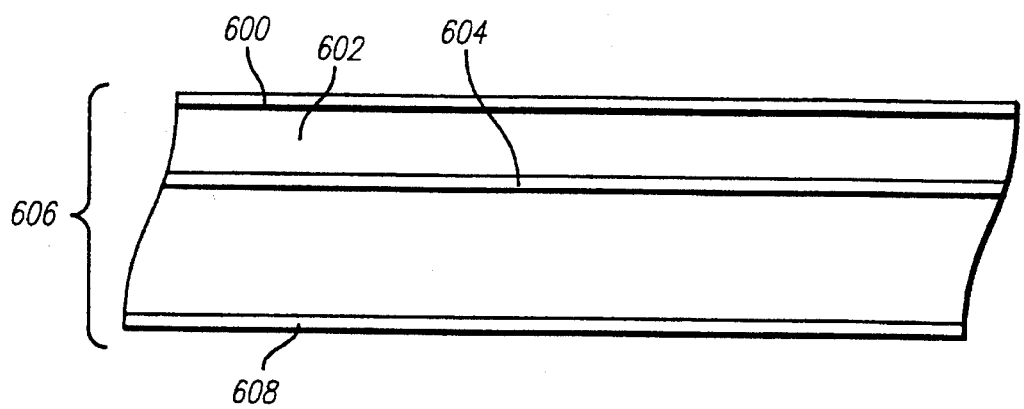
FIGS. 33-42 show the beginning steps to an alternative embodiment bond and etch-back process using a selective epitaxy process.

In a preferred embodiment, the present invention process provides a SIMOX wafer as described above, or preferably an SOI wafer. As seen in FIG. 33, the SOI wafer 606 has grown a front oxide layer 600 and a back oxide layer 608. Beneath the front oxide layer is an approximately 35 micron thick P-type epitaxial silicon layer or P-epi layer. There is also a buried oxide layer 604. This SOI wafer 606 is like that shown in FIG. 25(a), which was discussed in further detail above.

The front oxide layer 600 is etched through masks such as those shown in FIGS. 19–23 to form an oxide pattern with an array of surface damping grooves, wells, and a diaphragm outline. Through processes known in the art, photoresist is spun on the mask, then through photolithographically patterning the resist through the mask which blocks UV light to develop a resist that resembles the desired pattern. Next, HF is used to etch away the oxide in the various areas, and the resist is stripped away, leaving the oxide pattern. These prefatory steps for the substrate have already been discussed in detail above.

Figure 34:
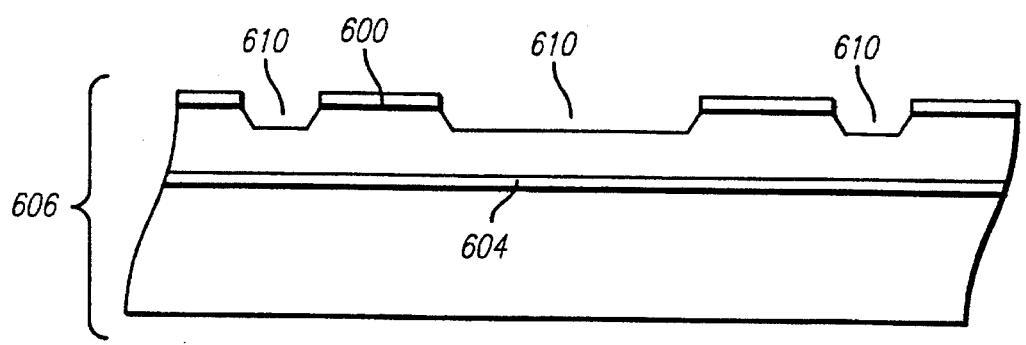

An application of KOH cuts the shallow areas generally three to five microns into the substrate. FIG. 34 provides a profile cross-sectional view of the SOI wafer 606 after undergoing the above steps. The shallow areas are denoted as item 610. The shallow areas 610 facilitate spin resist, which process is not easily adapted to deeper trenches because of uneven resist buildup, and because the resist tends to pull away from sharp corners and edges. Thus, the shallow areas 610 appear much like a flat wafer to a spin resist process, which processes is critical for high production.

Figure 35:
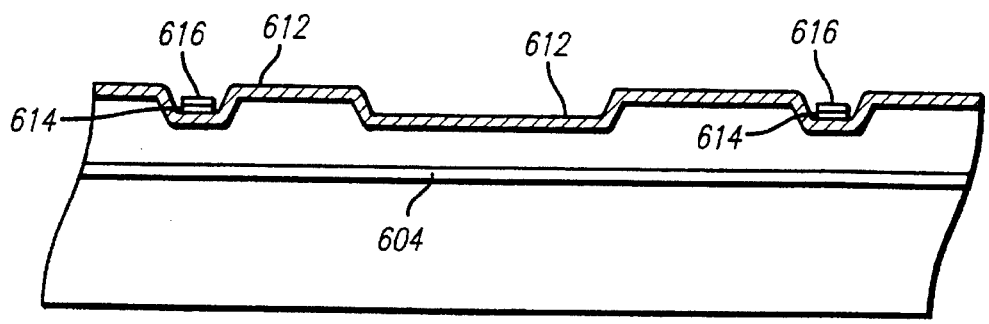

In the next step, shown in FIG. 35, the previously defined shallow areas 610 coinciding with damping grooves, shallow wells, and diaphragm areas have been stripped of the oxide layer 600 using HF. A layer 612 of silicon nitride ($Si_3N_4$) is deposited using low pressure chemical vapor deposition (LPCVD). The LPCVD nitride 612 is preferably approximately 1,000 Angstroms thick. Next, an area of ion beam sputtered silicon oxide ($SiO_2$) of preferably 500 to 1,000 Angstroms thick is deposited within the shallow wells 610 to form oxide caps 614.

Then approximately 1,000 Angstrom thick layer of reactively ion sputtered silicon nitride ($Si_3N_4$) is deposited in the shallow wells 610 to form nitride caps 616 to protect the oxide caps 614 during subsequent steps. It is deposited at room temperature and allows use of a resist mask to inverse pattern the film, under a lift off process, known in the art. The lift off process lifts off the resist and the film in predetermined areas because the resist prevents adherence to the substrate. After application of acetone dissolves the resist and lifts off the unwanted oxide/nitride film, a stack comprising of the oxide cap 614 and the nitride cap 616 remains.

In an alternative embodiment process (not shown), the stack can be deposited on a planar surface, not necessarily in shallow wells 610 as shown in FIG. 35. The reason for depositing on a shallow well instead of a planar surface is to allow space for a depletion region of suitable thickness to be formed in the oppositely doped epitaxial growth that will later occupy this space or cavity in this junction isolated embodiment.

Figure 36:
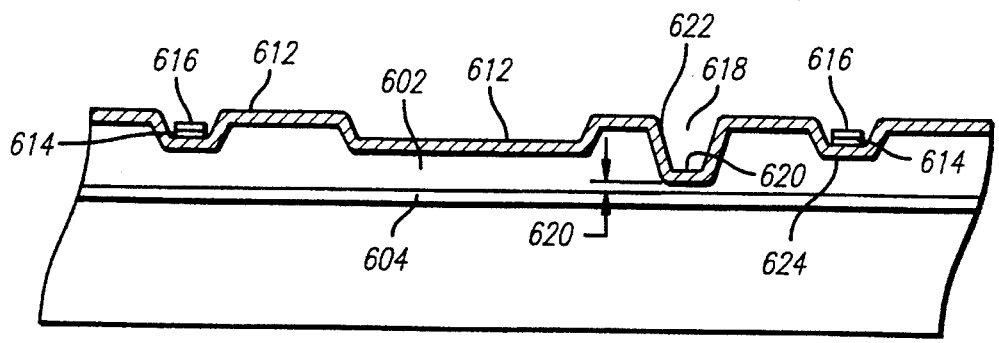

A deep trench is now formed, which becomes the hinge of the accelerometer. Specifically, as seen in FIG. 36, the LPCVD nitride 612 has been patterned with a hinge Well 618 using resist and plasma etching. The former process is preferable because the underlying surface is not needed and can be etched away.

After the LPCVD nitride 612 is patterned with a hinge well 618 to form the hinge, KOH is applied for a deep etch to remove typically twenty to twenty-five microns of material to the desired depth. This establishes the hinge thickness 620, which is the distance from the buried oxide layer 604 to the bottom of the hinge well 618. The hinge thickness 620 varies depending upon the g-range and torsional stability required for the accelerometer, usually ranging from two to ten microns.

During the plasma or phosphoric etch, the nitride cap 616 protects the oxide cap 614. During the KOH etch, the oxide cap 614 is protected by the nitride cap 616.

The LPCVD nitride 612 is needed to protect the epitaxial silicon 602 during the next oxidation step. On the other hand, the interior epitaxial silicon 602 of the hinge well 618 is unprotected after the KOH etch. It is now exposed to an oxidation process comprising of heating water vapor in a furnace thereby oxidizing the hinge well 618 surfaces. This thermal oxidation process, which occurs at 1000 to 1100 degrees C., is known in the art. As a result, as shown in FIG. 36, a growth of 2000 to 4000 Angstroms thick oxide covers the bottom 620 and side walls 622 of the hinge well 618. Water and oxygen diffusion are blocked in the other areas by the LPCVD nitride 612.

The wafer structure is no longer easily photo-patternable. The reason is that the depth of the hinge well 618 prevents the spin resist from properly coating the contours, which problem was discussed above.

In the following step, the LPCVD nitride 612 and nitride cap 616 must be removed to prepare the substrate for bonding in a subsequent step. Originally, the LPCVD nitride 612 and nitride cap 616 were needed to prevent the KOH from etching the epitaxial silicon 602 and to prevent the bare surfaces from oxidation. At this juncture, the LPCVD nitride 612 and nitride caps 616 are no longer necessary.

Hence, the wafer is immersed in 160 degrees C. phosphoric acid. The hinge well 618 is oxide covered and does not etch. The nitride cap 616 and all of the LPCVD nitride 612 are removed by the phosphoric acid, except for a small patch of LPCVD silicon nitride protected by oxide cap 614. This nitride patch is denoted as item 624.

Figure 37:
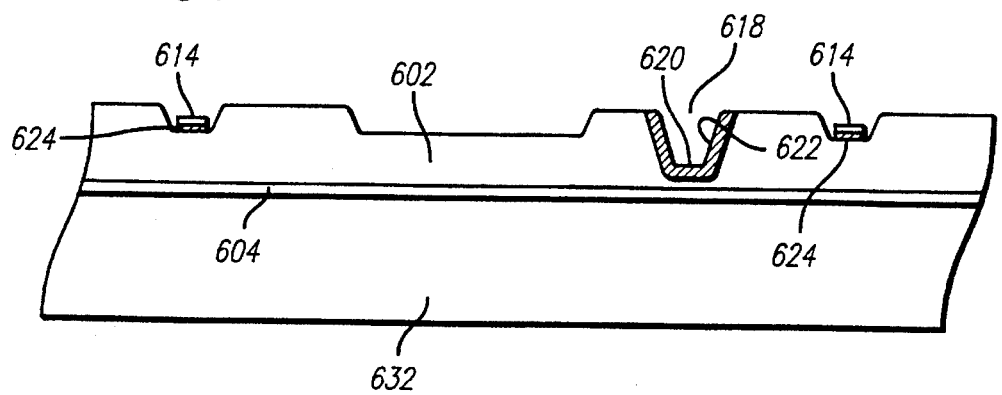

What is left is a bare silicon surface, a hinge well 618 covered by oxide 620, 622, and an oxide cap 614 covering a patch of LPCVD silicon nitride 624. This is depicted in FIG. 37.

Figure 38:
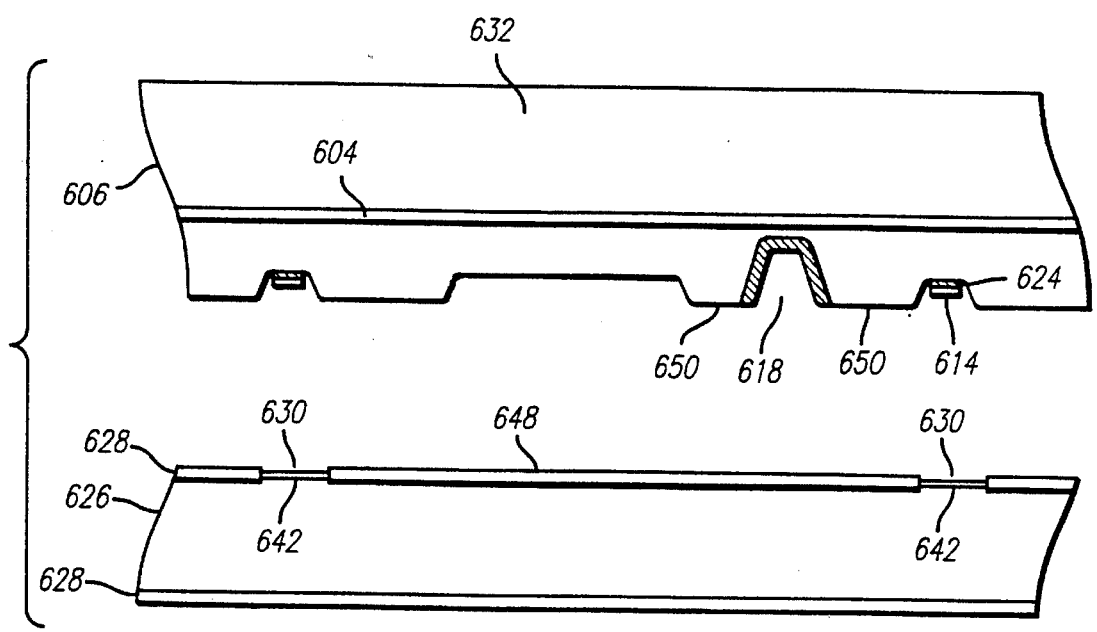

The next step is a patterned align bond. This entails use of alignment marks to infrared align features between the SOI wafer 606 and an oxidized wafer 626, which two structures are soon to be bonded together. The oxidized wafer 626 is a P-type silicon substrate having generally one micron thick thermal or PSG oxide layers 628 grown or deposited, respectively, thereon. The details of this type of substrate was discussed above. As seen in FIG. 38, a slot 630 is formed through the oxide 628 corresponding to the shallow wells 610.

Within each slot 630 is a reactively ion sputtered nitride layer 642, which is deposited through a deposition/lift-off process discussed above. This nitride layer 642 protects the underlying silicon. Beneficially, the mating surface 648 of the oxidized wafer 626 in its present condition is not roughened by the resist residue. Indeed, if nitride were applied by CVD and then the silicon surface from which was grown oxide surface 648 had to be etched to obtain the pattern, the etching process would generate coarseness in the oxide surface 648 to a roughness of a few Angstroms RMS. The roughened surface 648 would then not be smooth enough for a strong bond.

The mating surfaces 650 of the SOI wafer 606 and the mating surfaces 648 of the PSG oxide wafer 628 shown in FIG. 38 are prepared for bonding in accordance with the above discussion for other alternative embodiments. At this time, the SOI wafer 606 is dipped in 10:1 HF to remove the oxide cap 614.

Figure 39:
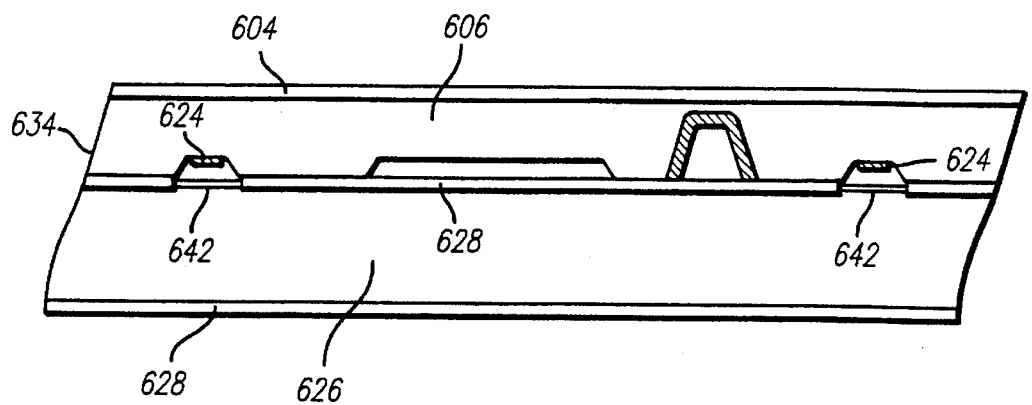

FIG. 39 shows the SOI wafer 606 bonded to the PSG oxide wafer 628. The handle wafer 632 portion, shown in FIGS. 37 and 38, of the SOI wafer 606 has been mostly ground down, then etched away completely with the previously buried oxide 604 serving as an etch stop.

The present invention process enjoys advantages which are clear at this instant. For example, in FIG. 39, at the top of the joined wafers, there is no unsupported oxide and there is a flat, continuous silicon surface directly beneath. There are no re-entrant slope trenches, which are not easily cleaned and dried of unwanted liquid leakage. The diaphragm or trench outlining the proofmass need not be formed yet with this process, thereby giving structural rigidity to the structure to endure rough handling.

Figure 40:
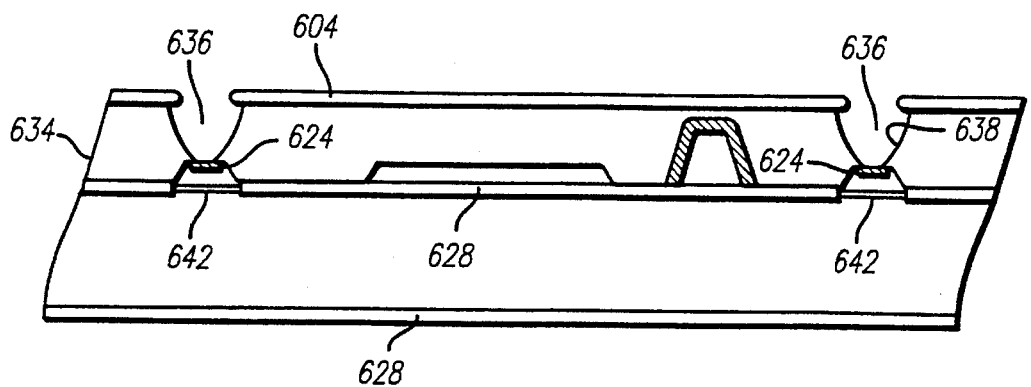

The bonded wafer 634 in FIG. 39 looks like a flat wafer that is ready for resist patterning of the substrate anchor wells and the trench outline for the proofmass and the hinges. Accordingly, in FIG. 40, the bonded wafer 634 is reactive ion etched to form deep slots 636, which etching stops at buried nitride layers 624 for anchors. An exemplary deep slot 636 is shown in FIG. 40, wherein the deep slot 636 serves as an anchor region after silicon epitaxy. Its depth terminates just at cutting through the nitride patches 624. Specifically, reactive ion etching with sulfur-hexafluoride ($SF_6$) and helium gas are used to cut the deep slots because this form of plasma etching is capable of cutting steeper-sloped walls with high etch rate. From FIG. 40 to FIG. 41, the reactive ion etch has cut through the nitride patch 624.

Figure 41:
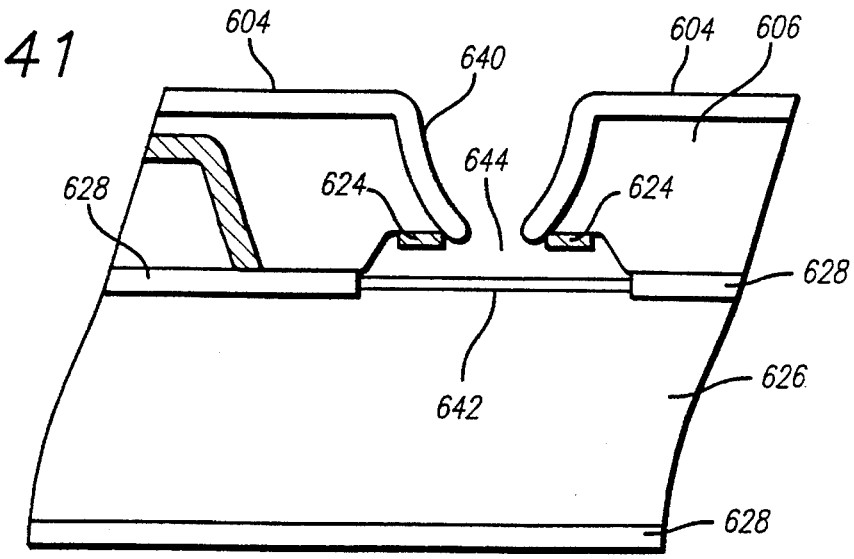

FIG. 41 is a magnified view of the deep slot 636 from FIG. 40. In the next step, the resist from the previous step is removed, and the inner wall 638 is oxidized in a furnace in accordance with the oxidation process described earlier. The inner wall 638 is thus covered with an oxide growth 640, shown in FIG. 41. The nitride patch 624 and the reactively ion sputtered nitride 642 are removed by application of phosphoric acid ($H_3PO_4$).

What is left is a bare silicon surface cavity 644 with a bare silicon bottom and overhanging ledges. The present invention process leaves bare silicon only where silicon epitaxy is desired. Furthermore, without the present invention process, it is very difficult if not impossible to obtain the cavity structure, despite conventional oxidation growth and photolithographic methods.

Figure 42:
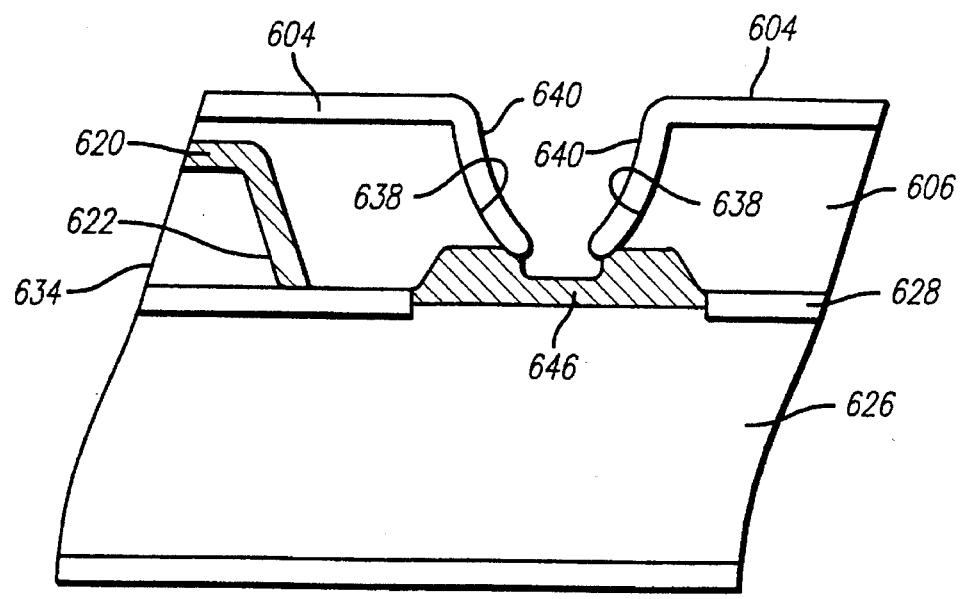

In FIG. 42, a selective epitaxy process, known in the art, is used to grow single crystal silicon only on exposed silicon areas in the cavity 644. The selective epitaxy 646 grows together with the substrate, wherein the process conditions are such that etching is balanced with deposition, and nucleation of polysilicon is kept from occurring on oxide surfaces but can occur on bare silicon surfaces. It is important to prevent epitaxy growth on the inner wall 638 due to protrusions that form on top, which interfere with subsequent bonding steps. Thus, the inner wall 638 is covered with oxide 638 to prevent such epitaxy growth. The selective epitaxy 646 grows with the same crystal axes as the original silicon substrate. This selective epitaxy growth 646 is therefore the anchor that holds the SOI epitaxial wafer 606 to the oxidized wafer 626. In sum, all of the foregoing steps culminate in forming the anchor which bridges the oxidized wafer 626 to the SOI epitaxial wafer 606.

As seen in FIG. 42, the bonded wafer 634 is now ready for removal of the buried oxide layer 604 which is now exposed by the back grind and etch-back procedures, and for optional removal of the side wall oxide 622 of the hinge well 618 to free up the hinge of the proofmass. From here on, the processing of the wafer may continue as described in the text accompanying FIG. 30.

In another alternative embodiment process of the present invention, which continues from FIG. 41, a non-selective epitaxy process may be used to fill the optional cavity 644 on up to the side walls 638 with polysilicon. To be sure, in a dielectrically isolated alternative embodiment of the present invention, there is no shallow well 610 in the SOI wafer 606 to form the cavity 644. The nitride patch 624 nevertheless is still used and serves as a barrier to the HF etch during undercutting.

Sometimes a non-selective epitaxy process is more preferable than the previously discussed selective epitaxy process. In this non-selective epitaxy process, polysilicon growth is not limited only to exposed silicon areas. Further, non-selective epitaxy has a growth rate that is much faster than selective epitaxy and better serves the purpose of filling the trench all the way up to the top. At that point, it is possible to mechanically polish or grind away the polysilicon within the trench to the desired depth. Any more polysilicon may be etched back under a semi-selective process to obtain the desired deposition pattern inside the trench.

Figure 44:
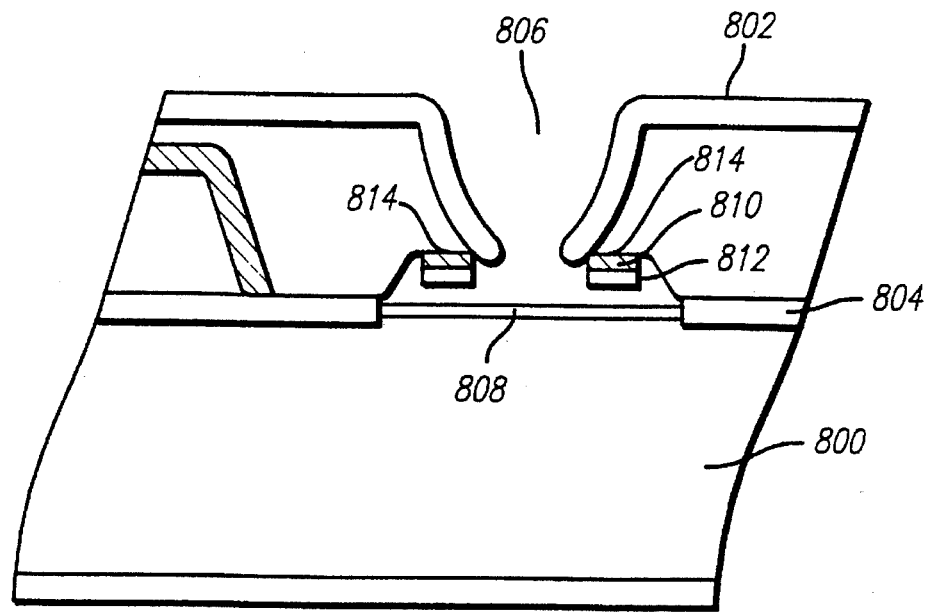
FIGS. 44-47 illustrate a non-selective epitaxy process modification to that shown in FIGS. 33-42.

FIG. 44 shows this alternative embodiment process, which continues from FIG. 41. In particular, this alternative embodiment uses non-selective epitaxy with dielectric isolation instead of junction isolation as results in the selective epitaxy process. It is similar to the preceding embodiment, except that the oxide cap 812 remains after etching the surrounding LPCVD nitride away to leave an LPCVD nitride patch 810. The oxide cap 812 remains because the oxide cap 812 is made to about 600 Angstroms instead of 500 Angstroms, and because there is a much shorter 10:1 HF dip performed after the LPCVD nitride strip before bonding.

This oxide cap 812 again serves the purpose of protecting the underside of the ledge 814 of the reactive ion etched deep slot 806, while the unprotected nitride 808 in the oxidized wafer 800 is removed in phosphoric acid. Next, the oxide cap 812 is removed in 10:1 HF.

Figure 45:
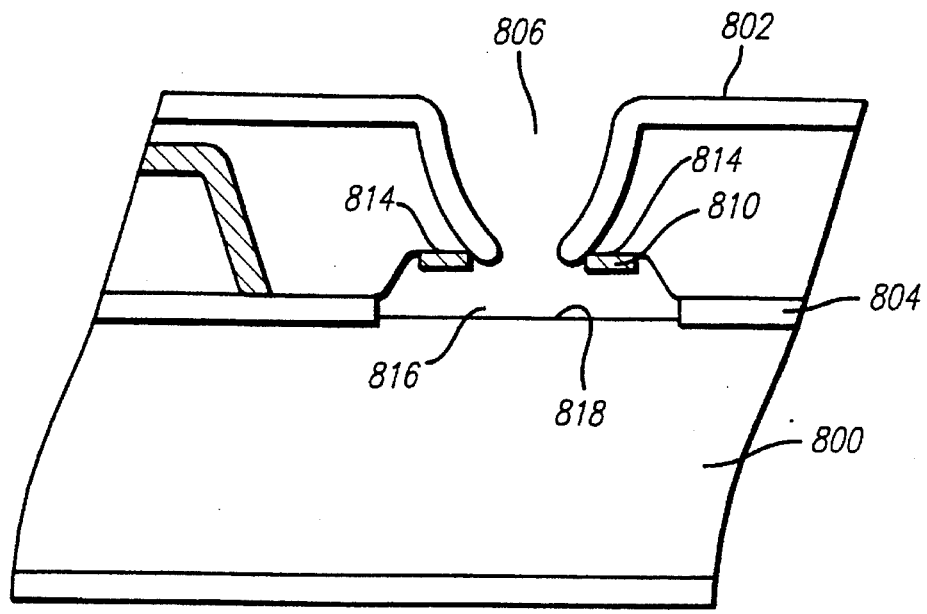

The resulting wafer appears in FIG. 45. Notably, remnants of the nitride patch 810 still cover the underside of the ledge 814, yet there is bare silicon 818 in the slot 816 formed in the PSG or thermal oxide layer 804. The wafer is now ready for epitaxy and polysilicon deposition.

Figure 46:
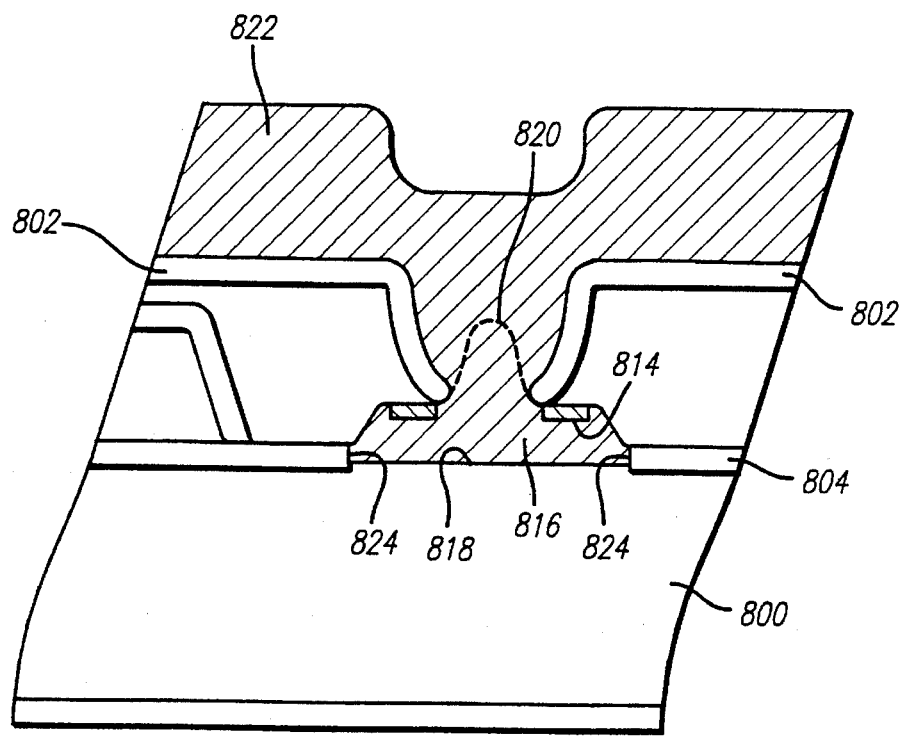

FIG. 46 shows where approximately 37 microns of silicon 822 is deposited non-selectively. But first, silane is introduced initially to deposit polysilicon 822 on all surfaces while single crystal growth occurs at the bare silicon interface. Subsequent growth is maintained with high rates using trichlorosilane or dichlorosilane until 37 microns thickness is obtained above all surfaces. At this point, the deep slot 806 is completely filled with crystal growth from below, merging into polysilicon growing from the oxidized walls 824 of the slot 816. Approximate boundaries of different crystalline regions is denoted by dashed line 820. For later sacrificial undercut of the PSG oxide layer 804, it is good to have only single crystal exposed to the HF etch due to possible attack of grain boundaries of the polysilicon 822.

In the next step, the non-selectively deposited silicon 822 of the wafer is chemical-mechanically polished back using standard polishing techniques as used with bare silicon wafers. Polishing does not change the deposited silicon 822 in the slot 816; it only reduces the high spots on top. The wafer is polished until only two to five microns of silicon 822 remain above the exposed buried oxide layer 802.

Figure 47:
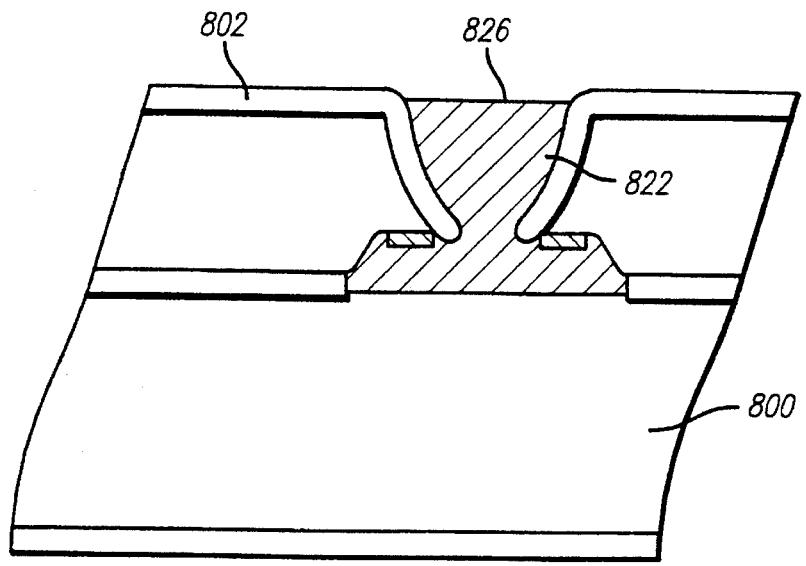

The remainder of the polysilicon 822 on the buried oxide layer 802 is removed by etching in KOH or by dry reactive ion etch. It is preferable to over-etch to ensure removal of all silicon 822 on the exposed surface of the buried oxide layer 802. The surface 826 of the polysilicon 822 is slightly recessed due to over-etch, as seen in FIG. 47.

The wafer is now ready for further processing to make an accelerometer or other instrument. Specifically, the wafer may undergo a pattern and reactive ion etch step to form a trench around a proofmass outline. Then the oxide on the surface of the wafer is removed and the wafer is cut. The two wafer halves are then joined by fusion bonding. During sacrificial etch, single crystal silicon and nitride which etches three orders of magnitude slower than oxide in HF, protect the oxidized sidewalls from the etchant.

Figure 43:
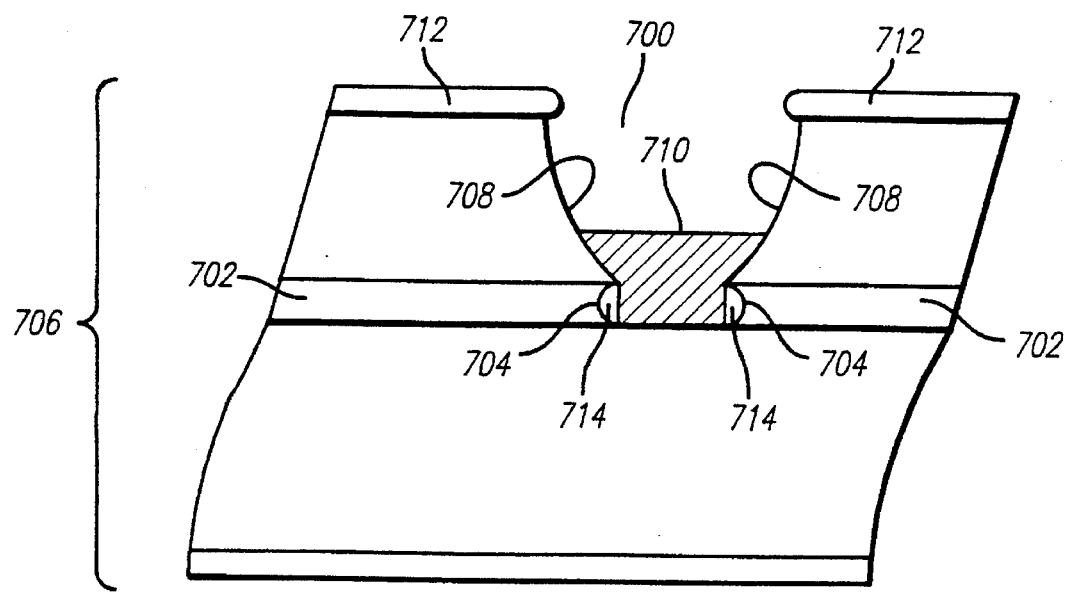
FIG. 43 shows another alternative embodiment process.

In yet another alternative embodiment, the process continues from the above-mentioned process beginning at FIG. 33. This alternative embodiment, shown in FIG. 43, includes etching out a trench 700 to meet buried oxide 702 in an SOI wafer 706 similar to that shown in FIG. 33. As seen in FIG. 43, there are no nitride patches to protect the oxide from the reactive ion etching process. Next, there is an oxide etch to remove the a portion of the buried oxide 702, causing the bulged wall 704 or undercutting.

Next, the trench 700 undergoes shadow-masked, reactively ion sputtered nitride to cover the side walls and the bottom. There must be an oxidation step to cover a portion of the upper wall 708 to prevent selective epitaxy build-up around the top of the upper wall 708. Thereafter, the nitride on the bottom of the trench 700 must be removed exposing bare silicon of the underlying substrate to allow selective epitaxy. After the nitride is removed, epitaxial silicon will grow there and interfere with bonding.

After the nitride is etched away, the trench 700 is filled by a growth of epitaxial silicon 710 in the form of a plug. There is no epitaxial silicon growth in voids 714 because the nitride is shadow masked and oxide will grow on any unprotected silicon area. The end product is similar to that shown in FIG. 42.

There has been described above novel processes for fabricating solid state instruments. Those skilled in the art may now make numerous uses of the teachings of the present invention, including varying the physical dimensions of the structure, varying the process to create similar devices with similar characteristics, and other modifications, without departing from the scope of the present invention which is defined solely by the scope of the following claims.

What is claimed is:

1. A method of fabricating a solid state instrument comprising the steps of:

providing a first semiconductor substrate having a buried oxide layer, a front covered with an oxide layer, and a semiconductor handle on a back;

forming a shallow well through the front oxide and the semiconductor substrate;

removing the front oxide layer;

depositing a silicon nitride layer on the front;

depositing a silicon nitride cap and an oxide cap in the shallow well;

removing the silicon nitride cap and the front silicon nitride layer except for a silicon nitride patch underlying the oxide cap;

providing a second semiconductor substrate having a front covered in an oxide layer, wherein the front oxide layer includes a slot covered with silicon nitride;

bonding the first semiconductor substrate front to the second semiconductor substrate front, wherein the shallow well substantially aligns with the slot;

removing the semiconductor handle of the first semiconductor substrate;

forming a deep slot through the back of the first semiconductor substrate substantially overlying the silicon nitride patch and oxide cap;

removing the oxide cap and partially removing the silicon nitride patch so that the deep slot is in communication with the shallow well and forms a cavity with a ledge, wherein a remaining silicon nitride patch covers the ledge;

removing the silicon nitride within the slot and the remaining silicon nitride patch;

depositing silicon inside the cavity;

cutting the bonded first and second semiconductor substrates into two complementary structures; and joining the complementary structures.

2. The method of claim 1, wherein the first semiconductor substrate further comprises an epitaxial silicon.

3. The method of claim 1, wherein the step of depositing the silicon nitride layer on the front further comprises low pressure chemical vapor deposition.

4. The method of claim 1, wherein the step of depositing a silicon nitride cap further comprises a lift off process.

5. The method of claim 1, wherein the step of removing the semiconductor handle further comprises grinding the semiconductor handle.

6. The method of claim 1, wherein the step of depositing silicon inside the cavity further comprises the step of selective epitaxy growth.

7. The method of claim 1, wherein the step of depositing silicon inside the cavity further comprises the step of non-selective epitaxy growth.

8. The method of claim 7, wherein the step of depositing the silicon further comprises the step of mechanical abrasion of the silicon.

9. The method of claim 1, wherein the step of forming a deep slot further comprises the step of reactive ion etching.

10. The method of claim 1, wherein the method further comprises the steps of etching the joined complementary structures with an etchant, and centrifuging the joined complementary structures to remove the etchant.

11. A method of anchoring a semiconductor substrate to another semiconductor substrate during fabrication of a solid state instrument comprising the steps of:

providing a first semiconductor substrate having a buried oxide layer, a front covered with an oxide layer, and a semiconductor handle on a back;

removing the front oxide layer;

depositing a silicon nitride layer on the front;

depositing a silicon nitride cap and an oxide cap on the front;

removing the silicon nitride cap and the front silicon nitride layer except for a silicon nitride patch underlying the oxide cap;

providing a second semiconductor substrate having a front covered in an oxide layer, wherein the front oxide layer includes a slot covered with silicon nitride;

bonding the first semiconductor substrate front to the second semiconductor substrate front, wherein the shallow well substantially aligns with the slot;

removing the semiconductor handle of the first semiconductor substrate;

forming a deep slot through the back of the first semiconductor substrate substantially overlying the silicon nitride patch and oxide cap;

removing the oxide cap and partially removing the silicon nitride patch and forming a cavity with a ledge, wherein a remaining silicon nitride patch covers the ledge;

removing the silicon nitride within the slot; and depositing silicon inside the cavity.

12. The method of claim 11, wherein the method further comprises the step of removing the remaining silicon nitride patch; and the step of depositing silicon inside the cavity further comprises the step of selective epitaxy growth.

13. The method of claim 11, wherein the step of depositing silicon inside the cavity further comprises the step of non-selective epitaxy growth.

14. The method of claim 13, wherein the step of non-selective epitaxy growth fills the cavity and substantially covers the buried oxide layer.

15. The method of claim 14, wherein the step of depositing silicon inside the cavity further comprises the step of exposing the cavity to a chemical selected from the group consisting of silane, trichlorosilane, or dichlorosilane.

16. The method of claim 15, wherein the step of depositing silicon inside the cavity further comprises the step of mechanical grinding of the deposited silicon covering the buried oxide layer.

17. The method of claim 16, wherein the step of depositing silicon inside the cavity further comprises the step of etching the deposited silicon.

18. The method of claim 11, wherein the method further comprises the steps of forming a shallow well through the front oxide and the semiconductor substrate; and wherein the step of depositing a silicon nitride cap and an oxide cap on the front further comprises the step of depositing the silicon nitride cap and the oxide cap in the shallow well.

19. A method of anchoring two semiconductor substrates comprising the steps of:

providing a first semiconductor substrate having a buried oxide layer and a front oxide layer covering a front of the first substrate;

forming a deep slot through the buried oxide layer and into the first substrate;

removing the front oxide layer;

covering a portion of the deep slot with a silicon nitride layer;

covering another portion of the deep slot with an oxide layer;

removing the silicon nitride layer; and filling the deep trench with a semiconductor material so that said semiconductor material is anchored on a portion of a second substrate.

20. The method of claim 19, wherein the method further comprises the step of patterning and reactive ion etching an outline of a proofmass in the substrate.

21. The method of claim 20, wherein the method further comprises the step of removing the front oxide layer and the buried oxide layer.

* * * * *